United States Patent
Hahn et al.

(10) Patent No.: US 11,577,914 B2
(45) Date of Patent: Feb. 14, 2023

(54) METHOD AND DEVICE FOR HANDLING CONTAINERS

(71) Applicant: Krones AG, Neutraubling (DE)

(72) Inventors: Wolfgang Hahn, Neutraubling (DE); Norbert Risse, Regensburg (DE); Heinz Woelfel, Bad Alexandersbad (DE)

(73) Assignee: Krones AG, Neutraubling (DE)

( * ) Notice: Subject to any disclaimer, the term of this patent is extended or adjusted under 35 U.S.C. 154(b) by 760 days.

(21) Appl. No.: 16/492,931

(22) PCT Filed: Feb. 20, 2018

(86) PCT No.: PCT/EP2018/054139
§ 371 (c)(1),
(2) Date: Sep. 10, 2019

(87) PCT Pub. No.: WO2018/162226
PCT Pub. Date: Sep. 13, 2018

(65) Prior Publication Data
US 2020/0019148 A1 Jan. 16, 2020

(30) Foreign Application Priority Data
Mar. 10, 2017 (DE) .......................... 102017203965.5

(51) Int. Cl.
*B65G 43/10* (2006.01)
*B65G 47/70* (2006.01)
*G05B 19/418* (2006.01)

(52) U.S. Cl.
CPC ............. *B65G 43/10* (2013.01); *B65G 47/70* (2013.01); *G05B 19/4189* (2013.01);
(Continued)

(58) Field of Classification Search
CPC ........ G05B 19/4189; G05B 2219/2621; G05B 2219/31273; B65G 47/70;
(Continued)

(56) References Cited

U.S. PATENT DOCUMENTS

| | | | | |
|---|---|---|---|---|
| 4,109,783 A | * | 8/1978 | Vogt .................... | B65G 47/261 198/781.08 |
| 5,285,887 A | * | 2/1994 | Hall ....................... | B65G 43/10 198/572 |
| 6,047,812 A | * | 4/2000 | Horn ....................... | B65G 43/10 198/460.3 |

(Continued)

FOREIGN PATENT DOCUMENTS

| | | |
|---|---|---|
| DE | 102013108177 A1 | 2/2015 |
| DE | 102015202660 A1 | 8/2016 |
| DE | 102015211380 A1 | 12/2016 |

OTHER PUBLICATIONS

ISA European Patent Office, International Search Report Issued in Application No. PCT/EP2018/054139, dated Jul. 4, 2018, WIPO, 4 pages.

*Primary Examiner* — Thomas Randazzo
(74) *Attorney, Agent, or Firm* — McCoy Russell LLP

(57) ABSTRACT

A method and device for treating containers with at least two container treatment machines, between which a transport device for transporting the containers is arranged, where the transport device is divided into several transport sections, where the flow of containers is changed from containers of type A to containers of type B, where a separating device is activated once the first transport section has run empty of containers of type A, where containers of the type B are transported into the first transport section and backed up at the separating device, while containers of type A are transported from the second transport section to the second container treatment machine, and where the separating (Continued)

device is deactivated once the second transport section has run empty of containers of the type A, so that the containers of type B are transported through the second transport section to the second container treatment machine.

17 Claims, 26 Drawing Sheets

(52) U.S. Cl.
CPC ............... *B65G 2201/0235* (2013.01); *B65G 2203/0208* (2013.01); *B65G 2203/042* (2013.01); *G05B 2219/2621* (2013.01); *G05B 2219/31273* (2013.01)

(58) Field of Classification Search
CPC .... B65G 2201/0235; B65G 2203/0208; B65G 2203/042; B65G 43/10; Y02P 90/02
See application file for complete search history.

(56) References Cited

U.S. PATENT DOCUMENTS

| | | | |
|---|---|---|---|
| 6,253,906 B1* | 7/2001 | Hall | B65G 43/10 198/460.1 |
| 2004/0112713 A1* | 6/2004 | Haan | B65G 43/10 198/419.2 |
| 2005/0049745 A1* | 3/2005 | LeVasseur | B65G 43/10 198/502.3 |
| 2005/0065641 A1* | 3/2005 | Nagai | B65G 47/261 198/781.06 |
| 2014/0156061 A1* | 6/2014 | Neiser | B65G 47/268 198/462.1 |
| 2014/0182999 A1* | 7/2014 | Acerbis | B65G 43/10 198/432 |
| 2014/0350719 A1* | 11/2014 | Fleischmann | B65G 43/08 702/173 |
| 2015/0336748 A1* | 11/2015 | Neiser | B65G 21/14 198/460.2 |
| 2017/0101273 A1* | 4/2017 | Itoh | B65G 13/07 |

* cited by examiner

METHOD AND DEVICE FOR HANDLING CONTAINERS

CROSS-REFERENCE TO RELATED APPLICATIONS

The present application is a U.S. National Phase of International Patent Application Serial No. PCT/EP2018/054139 entitled "METHOD AND DEVICE FOR HANDLING CONTAINERS," filed on Feb. 20, 2018. International Patent Application Serial No. PCT/EP2018/054139 claims priority to German Patent Application No. 10 2017 203 965.5 filed on Mar. 10, 2017. The entire contents of each of the above-referenced applications are hereby incorporated by reference for all purposes.

TECHNICAL FIELD

The invention relates to a method and a device for treating containers with at least two container treatment machines.

BACKGROUND AND SUMMARY

Container treatment machines typically transfer treated containers to a transport device on which the treated containers are transported to a further container treatment machine.

When changing the production over to a container of another type, i.e. one that has a different container geometry and/or another product, many changeover processes need to be performed for changing the container treatment machines over to this new type of container. This also includes emptying the machine and filling the machine with the new container and possibly also a test run with the new container. These processes are often not automated and require operator intervention. It is also possible that these operations must be carried out at a lower performance level/speed of the machine or must be triggered with a push-button. This allows the operator to intervene when needed or to stop the process during the push-button operation. Automated conversion is also possible.

If a changeover for the machine, e.g. a block with a blow-molding machine, labeling machine and filler/capper, pertains to only a beverage, then the changeover is completed after a very short period of time, e.g. 10 minutes. The block could then theoretically produce. Since containers of the previous production could still be disposed in the inlet of the downstream machine, e.g. a disposable container packer, e.g. for the reason that the disposable container packer has not yet been run completely empty by the operator, then the packer has not been released for the new production at the block. The reason for non-release is that mixing containers of the first type with containers of the second type on a transport route must be reliably prevented.

Therefore, although the block is ready for production, it cannot start production. A time delay and a loss of production then arises which cannot be compensated any more.

Another example is the transport of packers, in particular disposable packers to the palletizer. If the palletizer is not yet ready for production, the disposable container packer cannot yet produce. This can likewise lead to a loss of production time.

Proceeding from there, the object of the present invention is to provide a method and a device for treating containers which largely prevents production losses of the system when changing over from containers of a first type A to a second type B and enables a higher level of system availability.

According to the invention, this object is satisfied with a method for treating containers with at least two container treatment machines.

According to the invention, containers are treated with at least two treatment machines. Arranged between the treatment machines is a transport device for transporting the containers. When changing from containers of type A to containers of type B, a separating device between a first and a second transport section is activated, where the separating device separates the flow of containers between the first and second transport section. The separating device is activated once the first transport section has run empty of containers of type A. The transport sections directly adjoin one another in the direction of transport of the conveyors.

In this application, containers are understood as meaning individual containers or also an arrangement of containers, e.g. a package. The containers of type A differ from containers of type B, for example, by the bottled product or else the shape or geometry of the container and a resulting different package size or package shape. The separating device can therefore effectively separate the flow of different containers because containers of type B are backed up upstream of the separating device. Since the separating device is activated only when the first container section already no longer has any containers of type A, it can be ensured that no mixing of the containers of types A and B occurs. Even if there was a malfunction in a subsequent unit, for example, the subsequent container treatment machine or the upstream conveyors, no mixing of the two types occurs when backed up. Therefore, it is possible that containers of the second type B are conveyed into the first transport section, while containers of the first type A are still in the second transport section and are conveyed out of this transport section. This means that the first container treatment machine is already released for production when the second container treatment machine has not yet emptied. This results in significant time-saving, since the production can begin immediately after the changeover without a long waiting period if the changeover process of the first container treatment machine is relatively quick, for example, if only the bottled product and respecting labeling etc. are changed over. It is safest for the first container treatment machine to be released only when the separating device has already been activated. However, in particular in the case of a longer first transport section, it is also possible that the first container treatment machine is released directly after the changeover operation, before the separating device has been activated. It is essential, however, that the separating device be activated after the first transport section has run empty of containers of type A and before a container of the second type B leaves the first transport section. The point in time when the first container of the second type B is still on the first transport section can be determined, for example, by way of the point in time of the start of production of the first container treatment machine and the conveying speed and the conveying path.

The separating device between the first and the second transport section can subsequently again be deactivated in such a way that the backed-up and subsequent containers of type B are transported through the second transport section toward, meaning in the direction of the second container treatment machine. The containers of the second type pass through the entire second transport section.

The present invention makes it possible to start production very quickly after the first container treatment machine has been changed over and the containers of type A and B can be prevented by the separating device from mixing. The loss of production time during the changeover can thus be effectively minimized and system availability can be increased. The invention can be easily implemented with a single transport path, i.e. without the use of switches and parallel paths and secondary buffers.

It is particularly advantageous to have the separating device be activated once the second transport section has run empty of containers of type A. A sufficient distance between the different types is then ensured and no mixing occurs even in event of malfunctions.

According to one embodiment, the separating device is additionally deactivated only when the second container treatment machine is prepared to treat the containers of type B. For this purpose, the machine can output, for example, a corresponding signal to a control device which also controls the separating device. This is particularly advantageous if the separating device is located relatively close to the second container treatment machine. Smooth operation is then ensured.

It is also possible, in particular in the case of longer transport distances, that several separating devices are provided between the first and second treatment machine, where a further $n^{th}+2$ transport section is provided in particular after the nth+1 transport section, where an $n^{th}+1$ separating device between the $n^{th}+1$ and $n^{th}+2$ transport section is activated once the $n^{th}+1$ transport section has run empty of containers of the type A and containers of the second type are conveyed into the $n^{th}+1$ transport section, while containers of the type A are transported out of the $n^{th}+2$ transport section, where preferably the $n^{th}+1$ separating device is deactivated once the $n^{th}+2$ transport path has run empty (and preferably simultaneously the second container treatment machine is ready for containers of type B). The transport sections are arranged adjoining one behind the other in the direction of transport. This means in particular that a downstream transport section is arranged at the end of the preceding transport section.

This means that, for example, an $n^{th}+1$ separating device, e.g. a second separating device, is activated once its leading transport section has run empty of containers of type A. In this case, for example, the $n^{th}+1$ transport section, i.e. the second transport section of the $n^{th}+1$, e.g. second transport device, can correspond to the second transport section of a first separating device. The advantage of several separating devices is that the size of the buffer in the individual separating devices can be selected to be smaller as compared to a single separating device because the buffers are distributed along the transport path.

It is particularly advantageous to have products of the second type B back up upstream of the separating device while the separating device is activated. For this purpose, a certain back-up stretch can be provided which receives the backed-up containers.

The separating device advantageously comprises a conveyor between the first and second transport section or between the $n^{th}$ and $n^{th}+1$ transport section, which stands still when the separating device is activated, so that the containers back up on and upstream of the conveyor. This embodiment is particularly easy to implement and can back up the containers particularly gently.

The transport device preferably comprises several individually actuatable conveyors, where the at least one separating device comprises one of the conveyors which upon activation of the separating device stops such that the containers back up, where the conveyor acting as a separating device is arranged in the end region (i.e. the end facing away from the first container treatment machine) of the respective transport section or the transport path of the conveyor corresponds to the transport section. If a respective specific conveyor is associated with a respective separating device, the at least two transport sections each have a predetermined length and a predetermined position.

It is particularly advantageous to have several transport sections be provided, each corresponding to the transport path of successive conveyors. This means that the length of the transport section corresponds to the transport path of the conveyor. Several shorter transport sections are therefore provided. When the conveyors have respectively run empty of containers of type A, then the respectively emptied conveyor, which in the direction of transport is located at the front behind the containers of type A, is stopped until the conveyor of containers of type A, that in the direction of transport is the next one, has emptied, which is then stopped again, where the preceding conveyor enters back into operation. This embodiment is particularly suitable for transport paths that are not intended for back-up operation. In this embodiment, the activated separating devices therefore follow the motion of the packages of the first type A.

Alternatively or additionally, it would also be possible for the separating device to comprise a mechanical back-up element which is introduced into the transport path of the containers.

A corresponding back-up element can be realized, for example, such that a stopper with a pneumatic cylinder pivots onto the conveyor, which stops the incoming items. However, the use of the conveyor as part of the separating device is advantageous because several conveyors, which can be actuated separately from one another, are typically provided anyway between a first and a second container machine.

According to a preferred embodiment, the containers of first type A and the containers of second type B differ only to the extent that the same transport device can be used between the first container treatment machine and the second container treatment machine. This is the case, in particular, where the same containers are used, but only with a different food filling. In the case of corresponding containers, the changeover work at the container treatment machines is then less, so that, for example, the first container treatment machine is available relatively quickly. It is then particularly advantageous to have the production of containers of type B start before the second container treatment machine has run empty and the containers of type B can then be backed up upstream of the separating device.

According to a preferred embodiment, it can be determined by way of at least one sensor at the first and/or second (or $n^{th}+1$) transport section whether containers of first type A are disposed in the first and/or second (or $n^{th}+1$) transport section. There are various possibilities for this. For example, to determine the containers on the first and the second transport section by way of a counting device, the number of containers of type A arriving on the first and/or the second (or $n^{th}+1$) transport section and the number of container of type A leaving the first and/or the second (or $n^{th}+1$) transport section are counted, the difference is determined and thus the number of containers disposed on the first and/or the second (or $n^{th}+1$) transport section can be determined. This is just one example of how this can be determined using sensors or counters.

The first container treatment machine advantageously generates a signal for the end of the production of containers of type A and passes this signal to the control device. Depending on this signal, it can then be determined whether containers of type A are disposed on the first or the second (or $n^{th}+1$) transport section or whether the first transport section is free of containers of type A. In particular the last container of type A, which was produced by the first container treatment machine, can be tracked since the transport speed, the transport distance and therefore the theoretical time for transporting the container is known or stored. It can therefore also be deduced whether this last container has with certainty passed through the first transport section and is not yet disposed in this region. It is also possible to link several pieces of information, for example sensor information, theoretically determined positions of a last container, etc., in order to deduce that a separating device can be activated and, possibly, to deduce, for example, that the second container treatment machine can be emptied and can be changed over when there is no longer any container of type A disposed on the transport sections between the first container treatment machine and the second container treatment machine.

A device for performing the method according to the invention comprises at least a first and a second processing machine. Provided between the first and second container treatment machine is a transport device with at least two transport sections. The transport device can comprise, for example, several conveyors arranged in series. Furthermore, the device comprises a separating device between the first and the second container treatment machine which, upon activation, can cut the flow of containers between the first and the second container treatment machine so that no containers can be transported from the first transport section into the second transport section.

Furthermore, the device comprises a control device which is configured such that it can activate the separating device between a first and a second separation section when changing over from containers of type A to containers of type B, such that the first transport section can already be fed containers of type B while at the same time containers of type A can be conveyed out of the second transport section without containers of type A and B being mixed, where the control device can then again deactivate the separating element so that the containers of type B can be transported via the second transport section to the second container treatment machine.

As already stated above, the separating device enables the separation of different containers in the flow of containers. It is advantageous that the first region can be filled with containers of type B, while at the same time the second transport section can be emptied of containers of type A without the containers mixing and/or running onto each other or backing up, respectively.

The device advantageously comprises several separating devices which are arranged one behind the other and are separated from one another by respective transport sections.

Furthermore, the device comprises a detection device which detects whether, during the product change, the first transport section has run empty of containers of type A and which, when the first transport section (i.e. the transport section arranged upstream of the separating device—for example in the case of several separating devices) has run empty, generates a signal on the basis of which the control device activates the separating device. The device can also comprise a second detection device which can detect whether the second transport section (meaning, the transport section, which is arranged immediately downstream of the separating device—for example in the case of several separating devices) has run empty and, when the second transport path has run empty, generates a signal on the basis of which the control device deactivates the separating device or the control device deactivates the separating device when a signal is generated that the second transport section has run empty and a signal is output by the second container treatment machine that the second container treatment machine is ready to treat the containers of type B.

According to a particularly preferred embodiment, a heating or cooling device is arranged between the first and the second container treatment machine and a separating device is preferably arranged upstream of the heating or cooling device and/or a further separating device downstream of the heating or cooling device. A respective heating or cooling device is, for example, a pasteurizer, a device for warming up the products, for example, to prevent condensation, or a cooling device for cooling hot-filled products. It is particularly advantageous to arrange a separating device upstream of the heating or cooling device, because the transport speed in the heating or cooling device is anyway very slow and the dwelling time in this device is long. It is particularly advantageous to have the separating device be arranged immediately upstream of the inlet to the heating or cooling device.

It is very advantageous to have the transport device have several individually actuatable conveyors between the first and the second container treatment machine. The separating device comprises a conveyor which is arranged, for example, between the first transport section and the second transport section and which stops upon activation of the separating device such that the containers running theretoward are backed up upstream of the conveyor. Such an embodiment is simple and inexpensive to implement.

According to the present invention, the at least one container treatment machine is at least one machine of the following group: stretch blow-molding machine, filler, labeler, packer, palletizer, pusher. At least one machine presently means that a first container treatment machine or a second container treatment machine can also be a block made up of several individual machines. According to the present invention, the first machine is preferably a block comprising a blow-molding machine, a labeler, a filler and a capper, and the second container treatment machine is a packer or a palletizer.

An embodiment is also advantageous in which the first container treatment machine is a packer and the second container treatment machine is a palletizer.

BRIEF DESCRIPTION OF THE FIGURES

The present invention shall be explained below in more detail with reference to the following figures.

DETAILED DESCRIPTION

Figure 1:
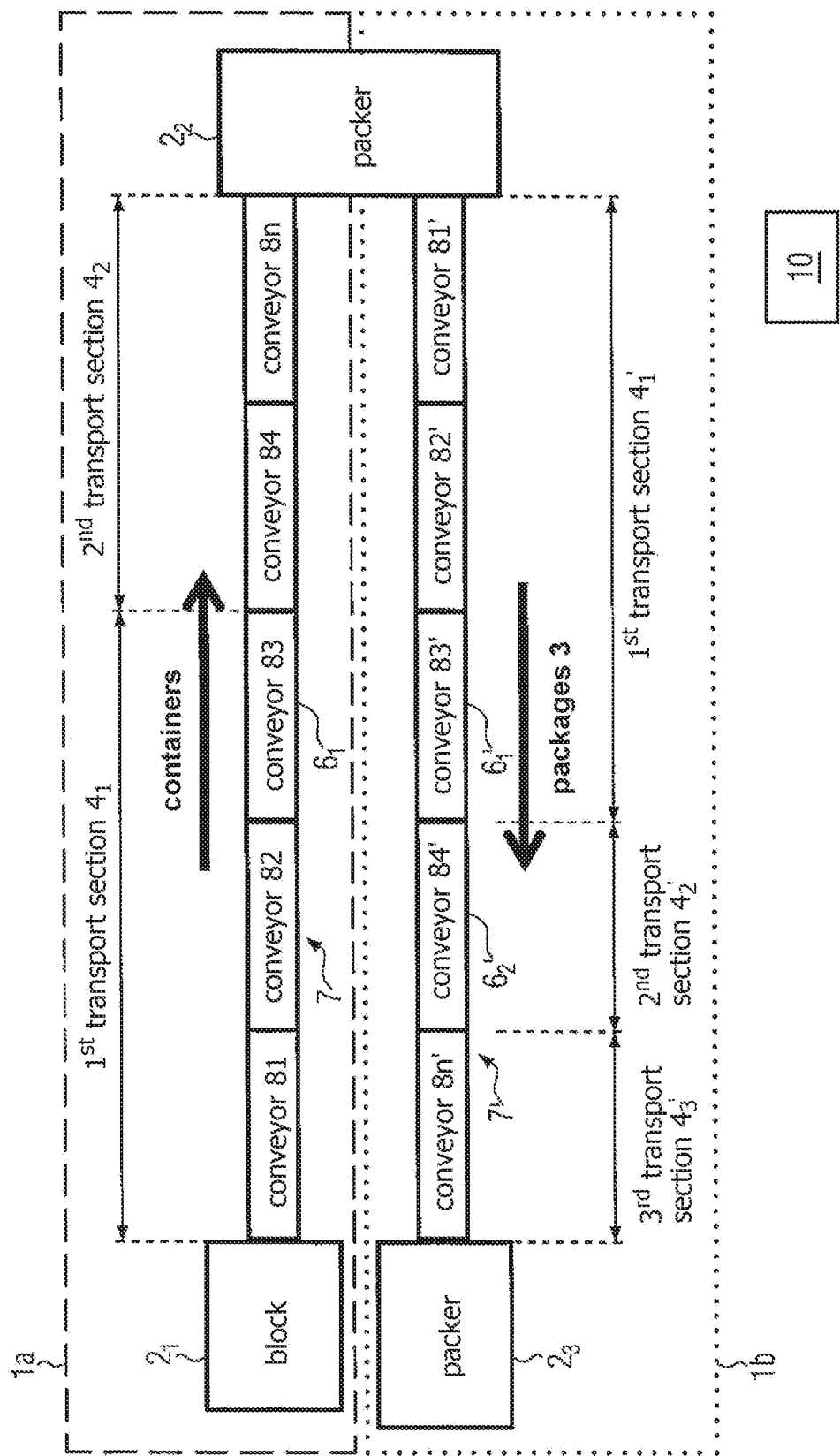
FIGS. 1-11 show a simplified schematic representation of a first embodiment according to the present invention.

FIG. 1 show a simplified schematic representation of, two devices 1*a*, 1*b* strung together according to the present invention. Device 1*a* according to the present invention shows a first container treatment machine $2_1$, presently e.g. a container treatment block, which comprises e.g. a filler and a capper or, according to a preferred embodiment, a stretch blow-molding machine, a filler, a labeler and a capper. Furthermore, device $1a$ comprises a packer $2_2$, for example, for the purpose of producing packages. Arranged between first and second container treatment machine $2_1$, $2_2$ is a transport device 7 which transports containers in a flow of containers from first container treatment machine $2_1$ to second container treatment machine $2_2$. The transport device can comprise several independently actuatable individual conveyors $8_1$-$8_n$, such as chain conveyors, roller or belt conveyors, etc.

In the embodiment shown in FIG. 1, a first transport section $4_1$ is defined, where several conveyors, presently conveyors $8_1$, $8_2$ and $8_3$, are arranged in first transport section $4_1$. Furthermore, a second transport section $4_2$ comprises at least one further conveyor, presently conveyors $8_4$ and $8_n$. Finally, the device comprises a separating device ($6_1$) between the first and the second container treatment machine which, upon activated, separates the flow of containers between first and second container treatment machine $2_1$, $2_2$ into first and second transport section $4_1$, $4_2$. The separation takes place such that no container can move any more from the first to the second transport section and vice versa. In this embodiment, separating device $6_1$ comprises conveyor $8_3$ which is located in the end region of first transport section $4_1$, i.e. is the last conveyor in the transport section. Upon activation of the separating device, this conveyor stops so that containers 3 back up upstream of conveyor $8_3$ and cannot pass into second transport section $4_2$. The separating device can alternatively also comprise a mechanical back-up element which can be incorporated into the flow of containers. A corresponding back-up element can be realized, for example, such that a stopper with a pneumatic cylinder pivots onto the conveyor, presently e.g. at the end of conveyor $8_3$, which stops the incoming containers.

Furthermore, device $1_a$ comprises a control device 10 which is configured such that it can activate separating device $6_1$ between an ($n^{th}$) first and a second ($n^{th}+1$) transport section $4_1$, $4_2$ when changing over from containers of type A to containers 3 of type B when there is no longer any container of type A disposed on first transport section $4_1$, such that the first transport section can already be fed containers 3 of type B while at the same time containers of type A can be conveyed out of second transport section $4_2$ without the containers of type A and B being mixed, which shall be explained in more detail below.

The control device is adapted such that it can also again deactivate separating device $6_1$, such that the containers of type B can be transported through second transport section $4_2$ in the direction toward second container treatment machine $2_2$.

Furthermore, the device according to the invention also comprises a first detection device which can detect whether, for example, containers of type A are disposed on the first transport section and/or the second or, in the case of several transport sections, the $n^{th}+1$ transport section. For this purpose, at least one sensor, not shown, is arranged on the first and/or the second transport section or, in the case of several transport sections, on the $n^{th}+1$ transport section. The position of the containers, for example containers of type A, can also be determined by tracking the last container of type A. For this purpose, container treatment machine $2_1$ can send a signal for the end of production of containers of type A to control device 10, where it can then be determined in dependence of the signal whether the container is disposed on the first or the second or the $n^{th}+1$ transport section. Tracking the containers is possible, since a respective position can be determined based on the known transport speed and the transport path. It is there assumed that no backup has been detected on the subsequent conveyor.

Additionally or alternatively to determining the containers on the first and/or second (or $n^{th}+1$) transport section, it is also possible that the number of containers of type A arriving on the first and/or the second (or $n^{th}+1$) transport section and the number of container of type A leaving the first and/or the second (or $n^{th}+1$)) transport section is counted by way of a counting device, and the difference is determined and thus the number of containers disposed on the first and/or the second (or $n^{th}+1$) transport section can be determined.

The position of the containers of type A or B can also be determined by way of cameras in the region of the transport sections These are only examples of how the position of the containers can be determined using sensors and counters, respectively.

FIG. $1b$ shows a second device according to the present invention in which packer $2_2$ represents the first container treatment machine and palletizer $2_3$ the second container treatment machine. Where this device corresponds to previously described device $1a$ with the exception that presently, e.g. there are three transport sections $4'_1$, $4'_2$, $4'_3$. Therefore, there are also two separating devices $6'_1$, $6'_2$, as shall be explained in more detail below.

The method according to the invention for treating containers when changing from containers of type A to containers of type B shall be described in detail below.

Figure 2:
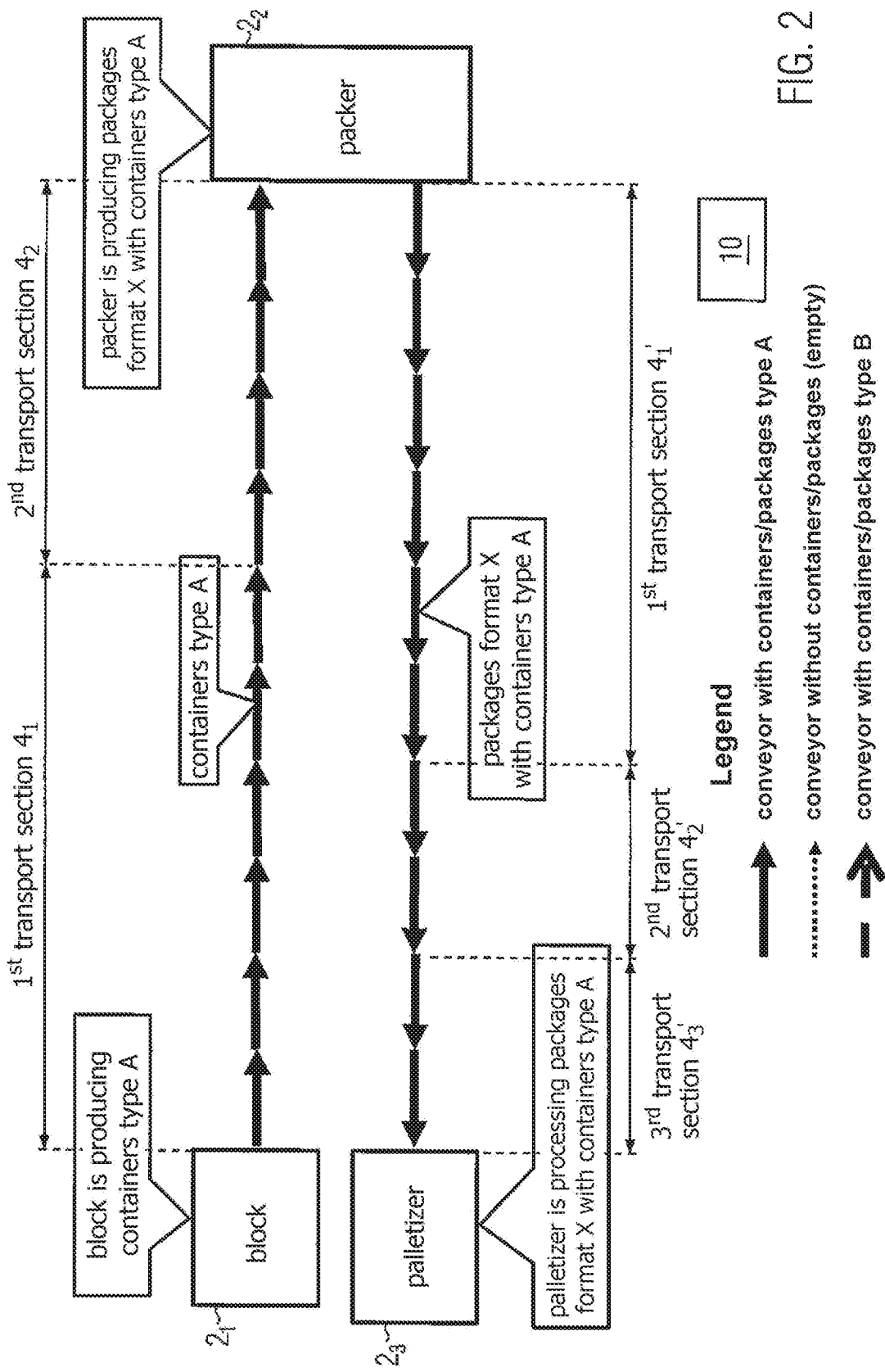

For example, PET bottles filled with a certain beverage are produced in container treatment machine $2_1$, where the PET bottles are produced, filled, labeled and closed and then transported via transport device 7 to the packer. A corresponding production of containers of type A is shown in FIG. 2. The continuous arrows represent the transport of containers of type A, the dotted lines represent a transport path without containers or packages (empty). The dashed lines show containers of type B. In this application, containers are understood to mean individual containers or also an arrangement of containers, e.g. a package (downstream of the packer).

Figure 3:
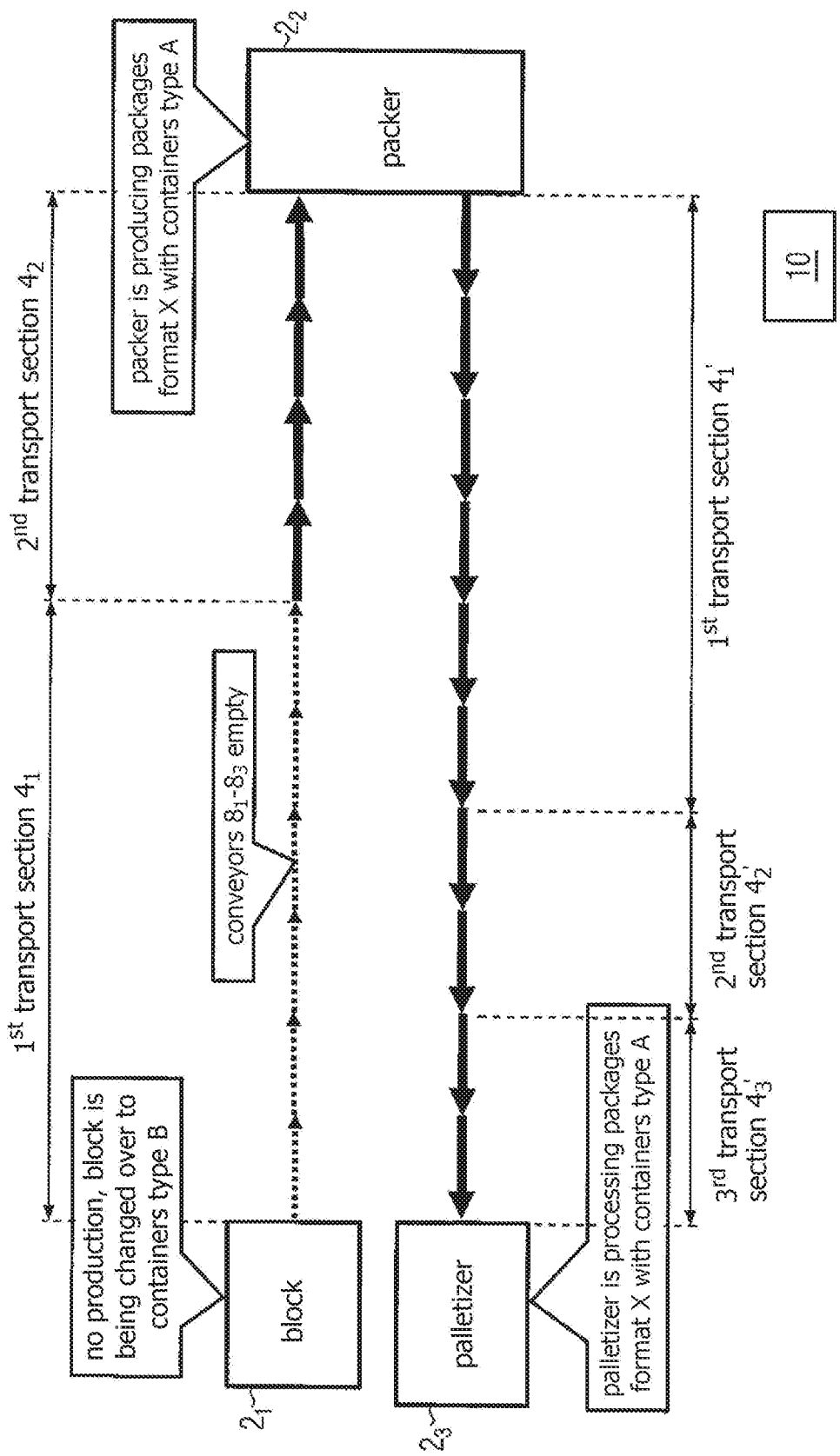

When changing over the production of containers of type A to containers of type B which, for example, have a different shape and/or capacity and/or content, container treatment machine $2_1$ must be converted accordingly. For this purpose, machine $2_1$ is first stopped. A corresponding signal can be sent to a control device 10. After the end of production of containers of type A, first transport section $4_1$ downstream of container treatment machine $2_1$ gradually runs empty, here last container $3_E$ moves in the direction of the packer, as is apparent from FIG. 3. The conveyor occupancy between machines $2_1$, $2_2$ can be determined e.g. by counting the incoming and outgoing containers 3, by sensors that are present for control device 10 of the production, such as photocells and back-up switches and by signal exchange of the container treatment machines with control device 10 (i.e. when the production was terminated or started, etc.), as already described in above.

Figure 4:
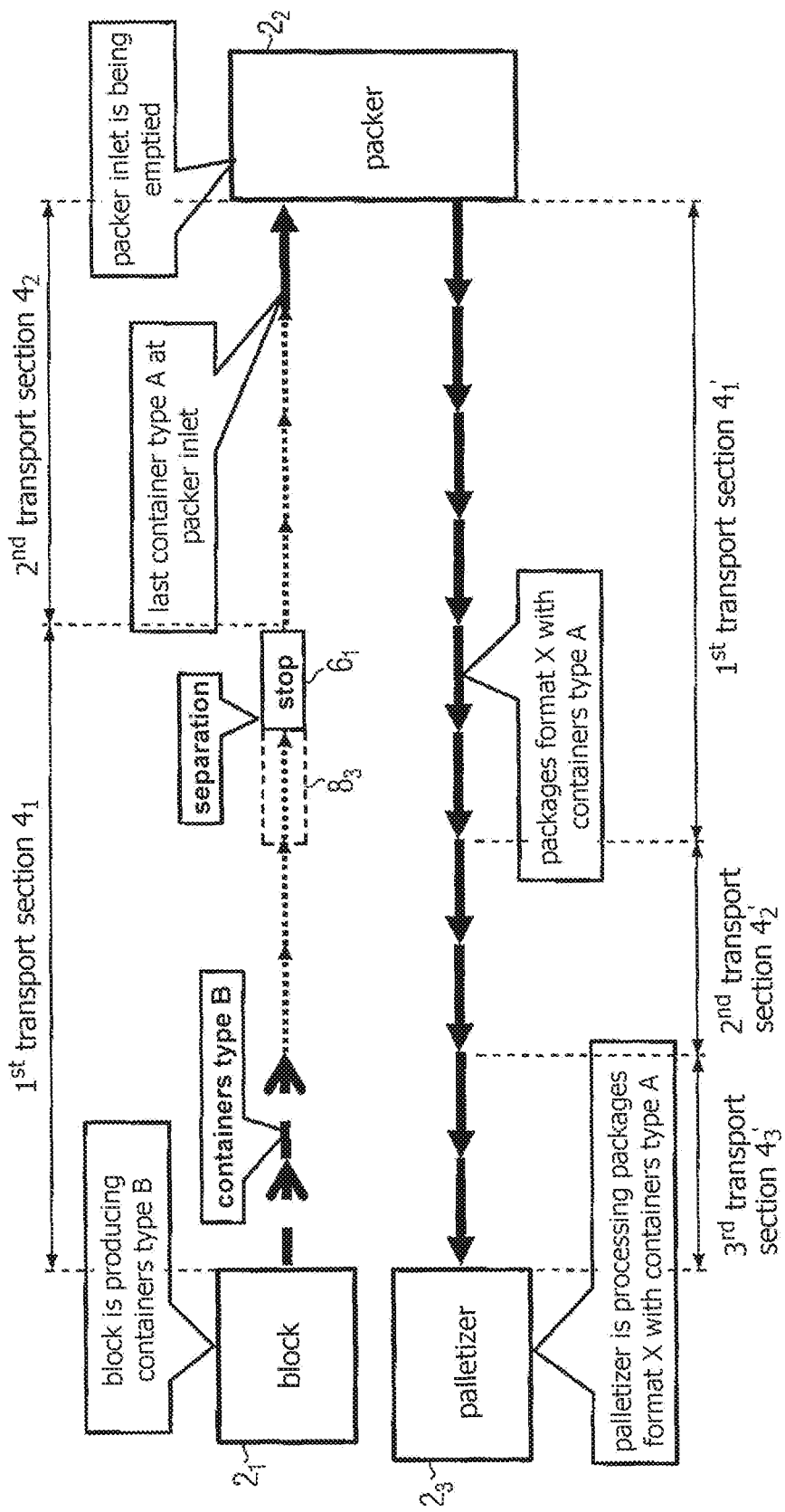

If it is now found that first transport section $4_1$ has run empty, then separating device $6_1$ is activated by control device 10, as shown in FIG. 4. In this embodiment, for example, conveyor $8_3$ is stopped, which is shown in dashed lines in FIG. 4. This means that container treatment machine $2_1$ does not have to wait until packer $2_2$ has run empty of containers of type A, but can already start production of container processing machine $2_1$ beforehand, either when the separating device has already been activated, as shown in FIG. 4, but also before that. It only needs to be ensured that the containers of type B are still disposed in the direction of transport upstream of the separating device, i.e. in first transport section $4_1$ when separating device $6_1$ is activated. The separating device entails the advantage that containers of type B can already enter the transport path between the first and the second container treatment machine, while the last containers of type A are still running out of transport path $4_2$. Even if back-ups arise at packer $2_2$ or at the conveyors downstream of separating device $6_1$, it can be reliably prevented that container of type A and B mix.

Figure 5:
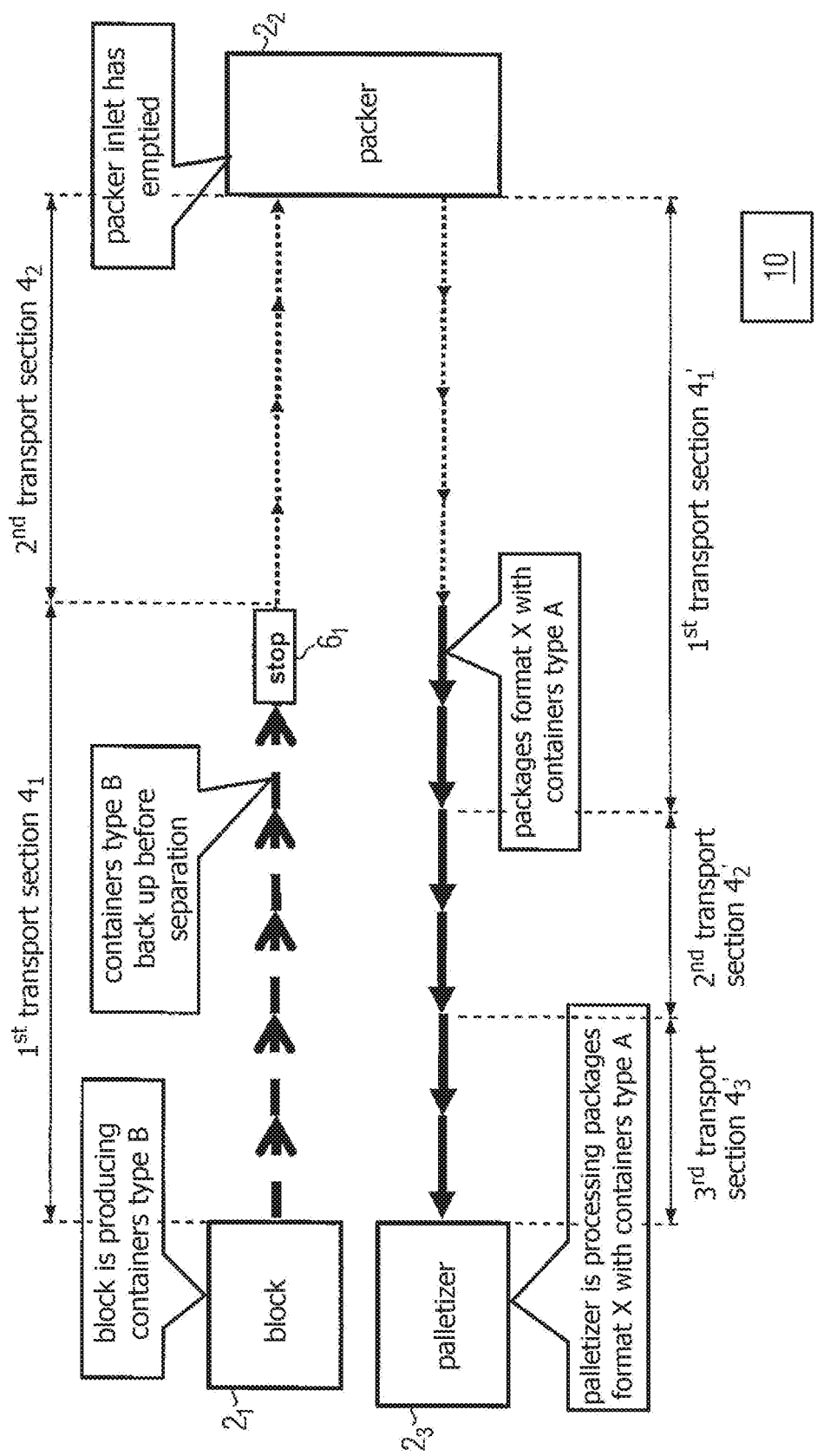
Figure 6:
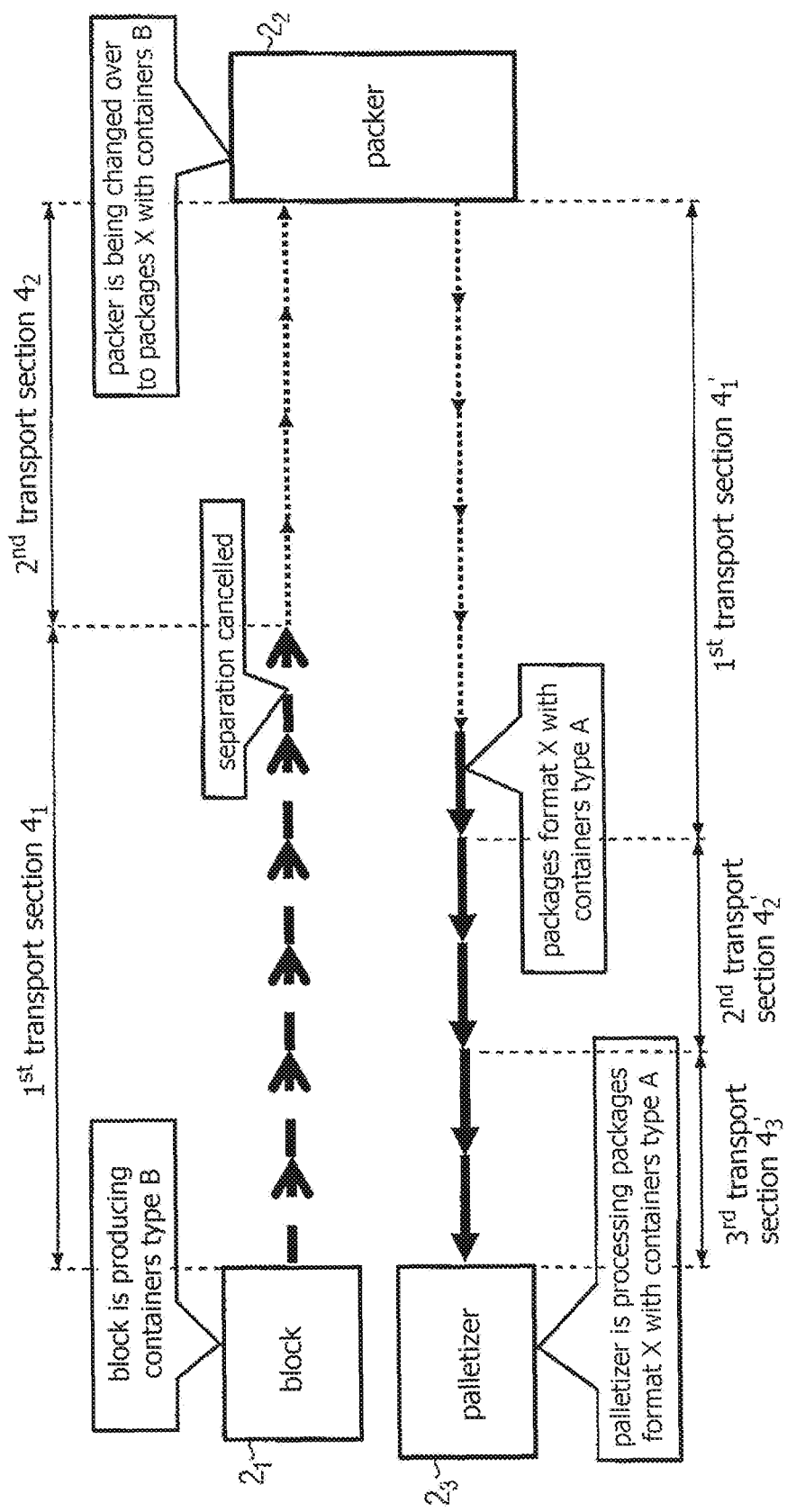

FIG. 5 shows a state in which second transport section $4_2$ has already been completely run empty of containers of type A. If it is determined by a respective device that no more containers of type A are disposed in second transport section $4_2$, i.e. presently that the packer inlet has run empty, as can be seen in FIG. 6, the separation can be canceled and containers of type B can now also be transported into second transport section $4_2$ in the direction of the second container treatment machine, presently packer $2_2$. The separation can be canceled, for example, in that conveyor $8_3$ is put back into operation. In the region of conveyor $8_3$, a so-called back-up stretch can be formed which is configured such that it can buffer the containers that were backed up. It is now possible, for example, that this buffer is drawn empty by an increased speed of the conveyors which are arranged downstream of the separating device. The buffer can also be emptied by the packer overperforming.

After the packer runs empty, the packer is changed over to the production of packages with containers B, as shown in FIG. 6. In this embodiment, the separation has already been canceled before the packer was completely changed over. According to a further embodiment, however, the separation can also be canceled only once a signal has been generated by the packer that a changeover has taken place. However, to cancel the separation beforehand entails a time advantage, where it is still ensured that no mixing of the products occurs.

Figure 7:
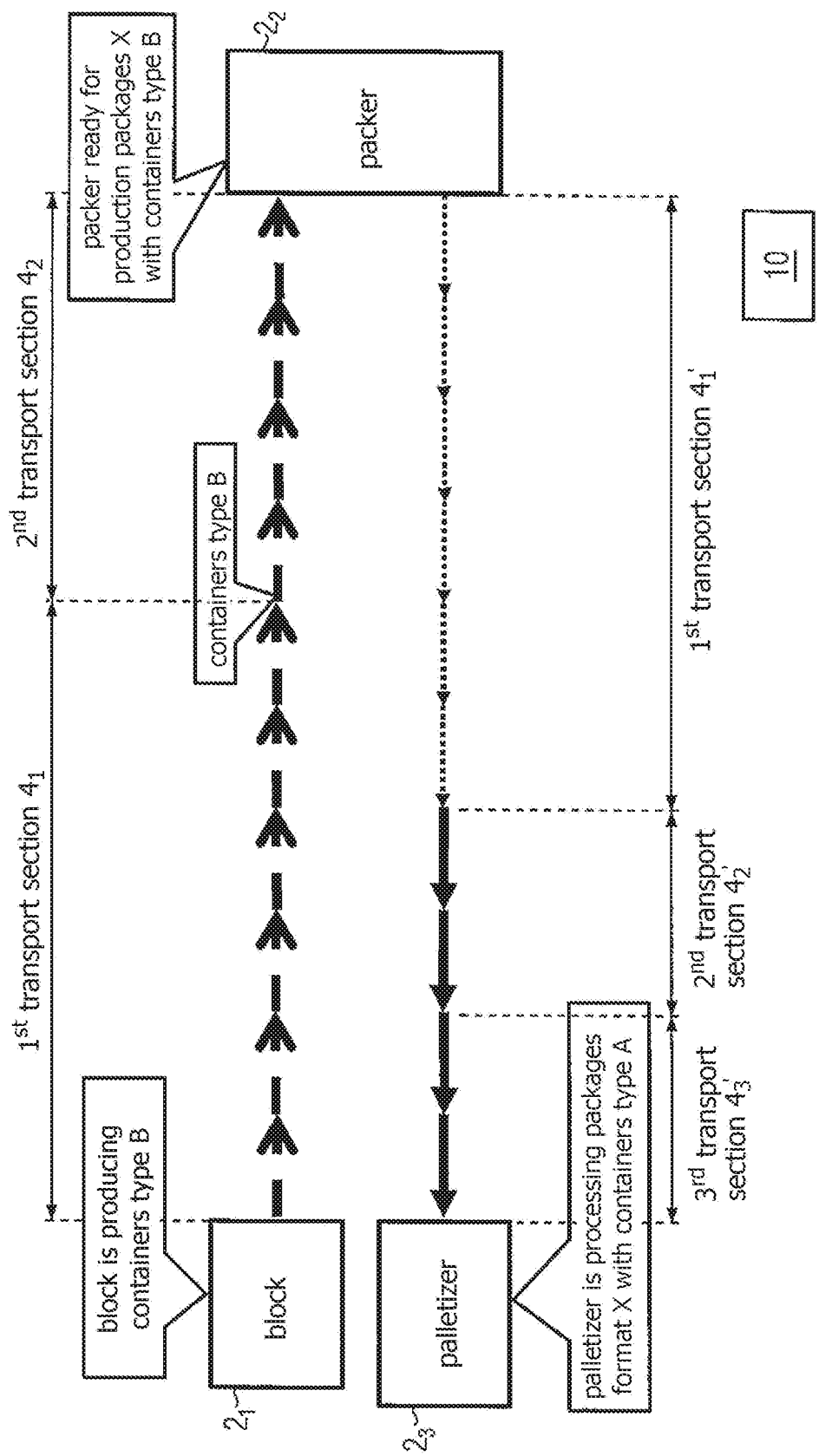

As can be seen from FIG. 7, the containers of type B are now transported from block $2_1$ to packer $2_2$ in the flow of products.

The packer is there ready for packages of type B but does not yet produce.

Therefore, the production could easily and safely be changed over in device $1a$ from containers of type A to containers of type B.

Figure 8:
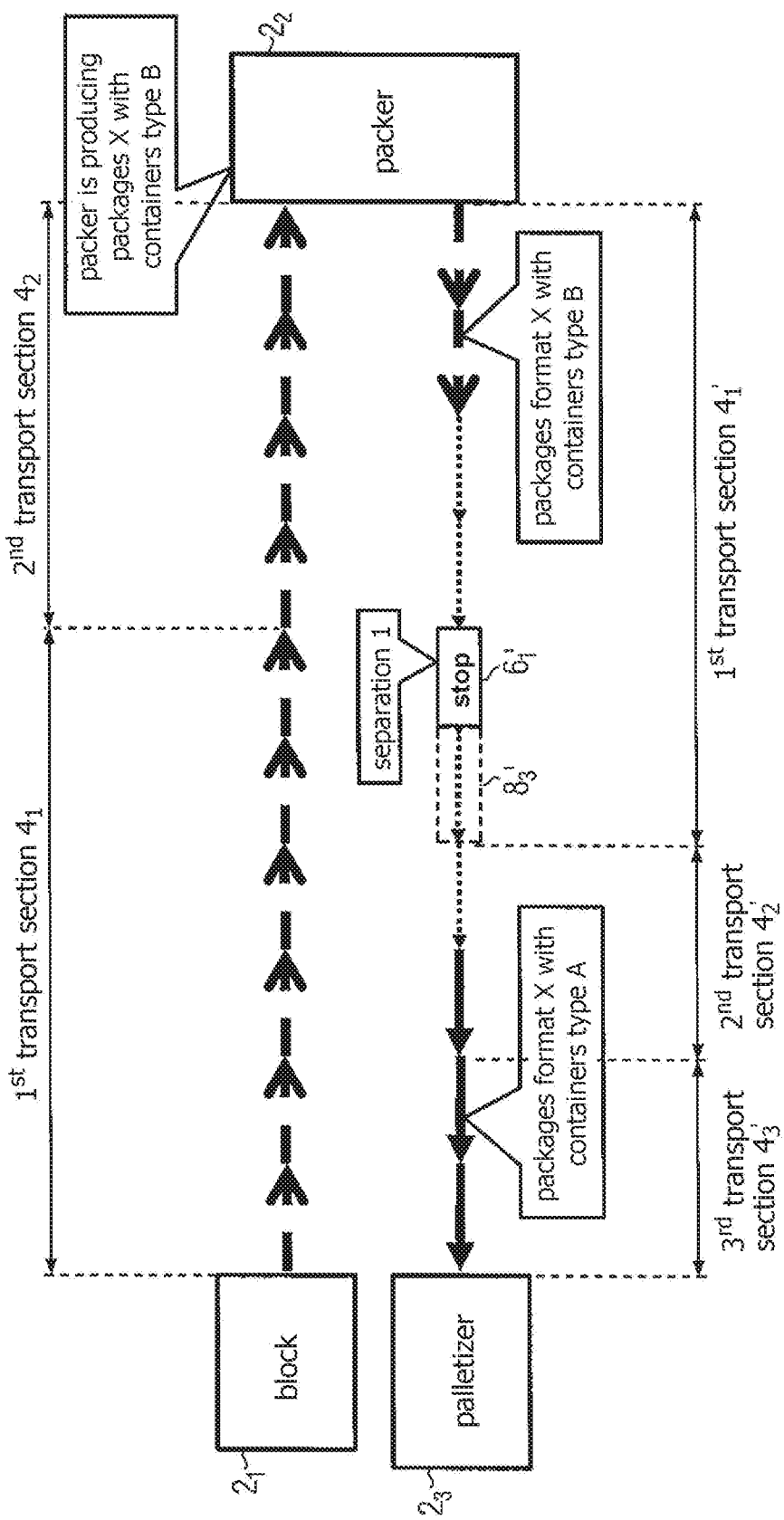
Figure 9:
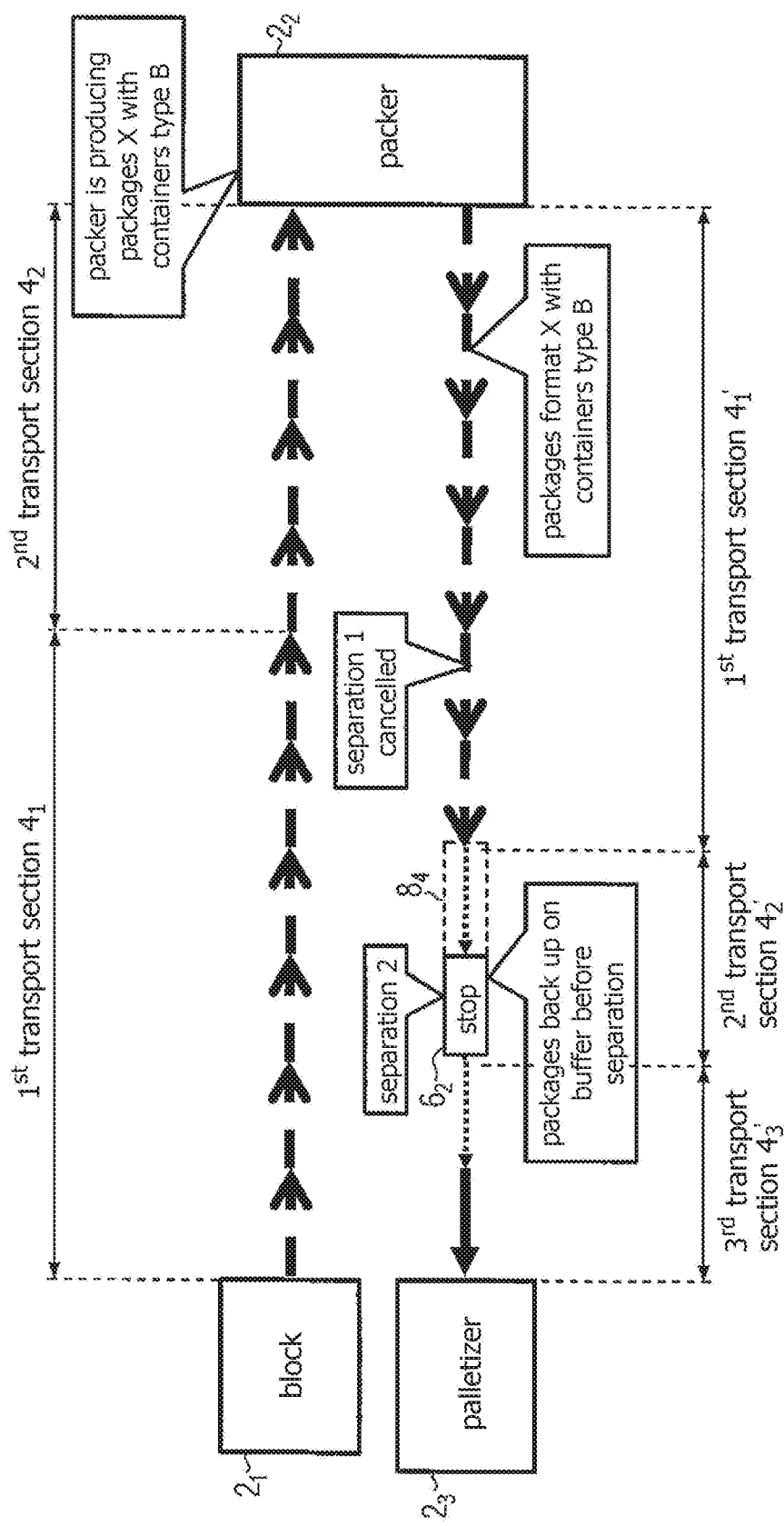

When viewing device $1b$, in which packer $2_2$ represents the first container treatment machine and palletizer $2_3$ the second container treatment machine, then it can be recognized in FIG. 7 that the last containers of type A, there already as a package, are still moving through second transport section $4'_2$ and third transport section $4'_3$ toward palletizer $2_3$. First transport section $4'_1$ has already been run empty, as is apparent from FIG. 7. This can be determined by a corresponding detection device, as described above. Since no container or package of type A is disposed in this region anymore, control device 10 activates first separating device $6'_1$, where, for example, conveyor $8_3$ is stopped in this embodiment. As can be seen from FIG. 8, packages or containers of type B can therefore already enter the first transport section, while packages or containers of type A are still being transported out of second or third transport section $4'_2$, $4'_3$. Mixing types can therefore be effectively prevented. When the last container or the last package of type A now leaves second transport section $4'_2$, this can be detected by a detection device, where a second separating device $6'_2$ can be activated, as is evident from FIG. 9. For example, conveyor $8'_4$ is then stopped there. At the same time, first separation $6'_1$ can be cancelled, so that containers of type B can move on to second transport section $4'_2$.

Figure 10:
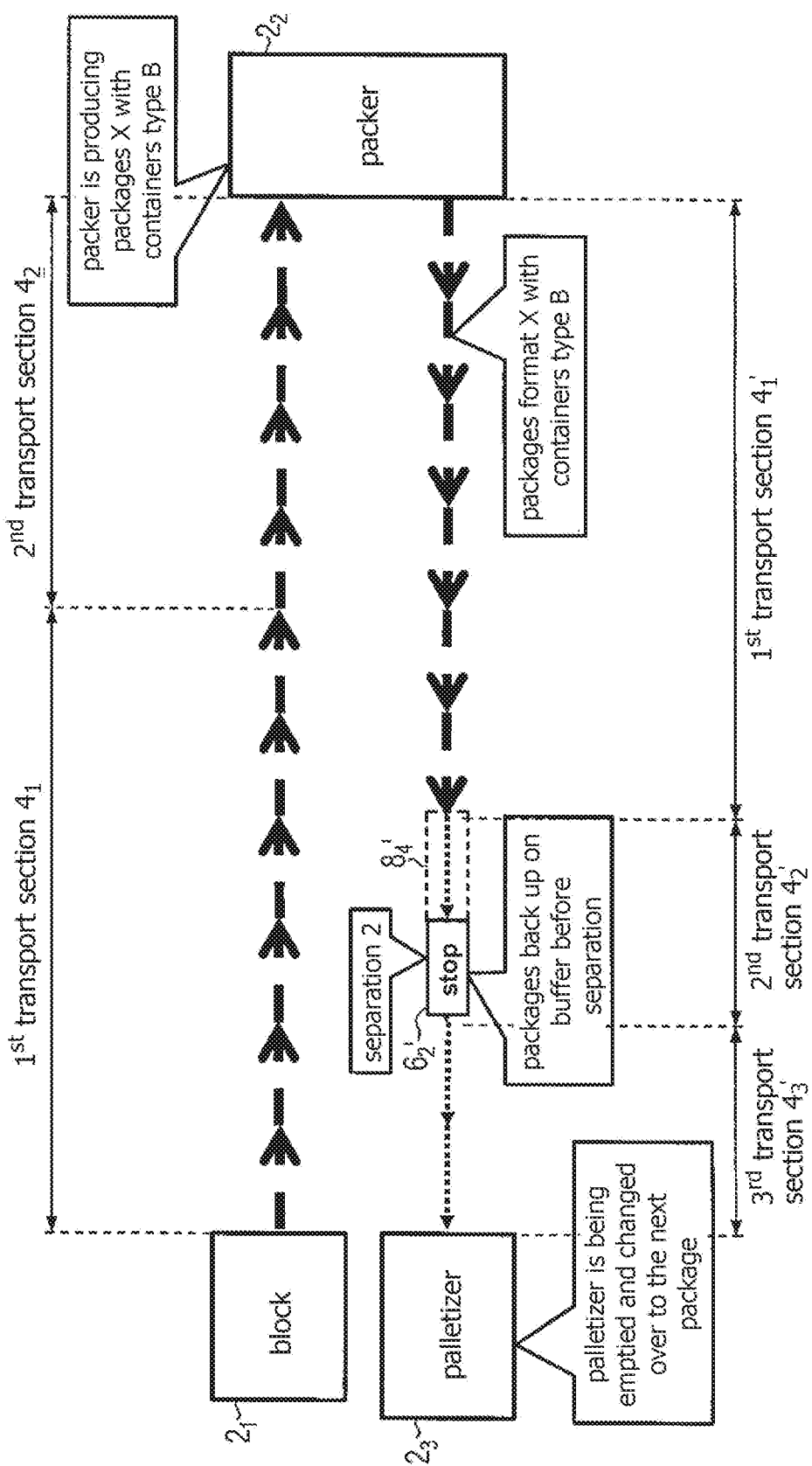

The advantage of several separating devices is that the size of the buffer in the individual separating devices can be selected to be smaller because the buffers are distributed along the transport path. As is apparent from FIGS. 9 and 10, the last containers of type A now also move out of third transport section $4'_3$. As shown in FIG. 10, when the palletizer has run empty, it can be changed over to the packages of containers of type B.

Figure 11:
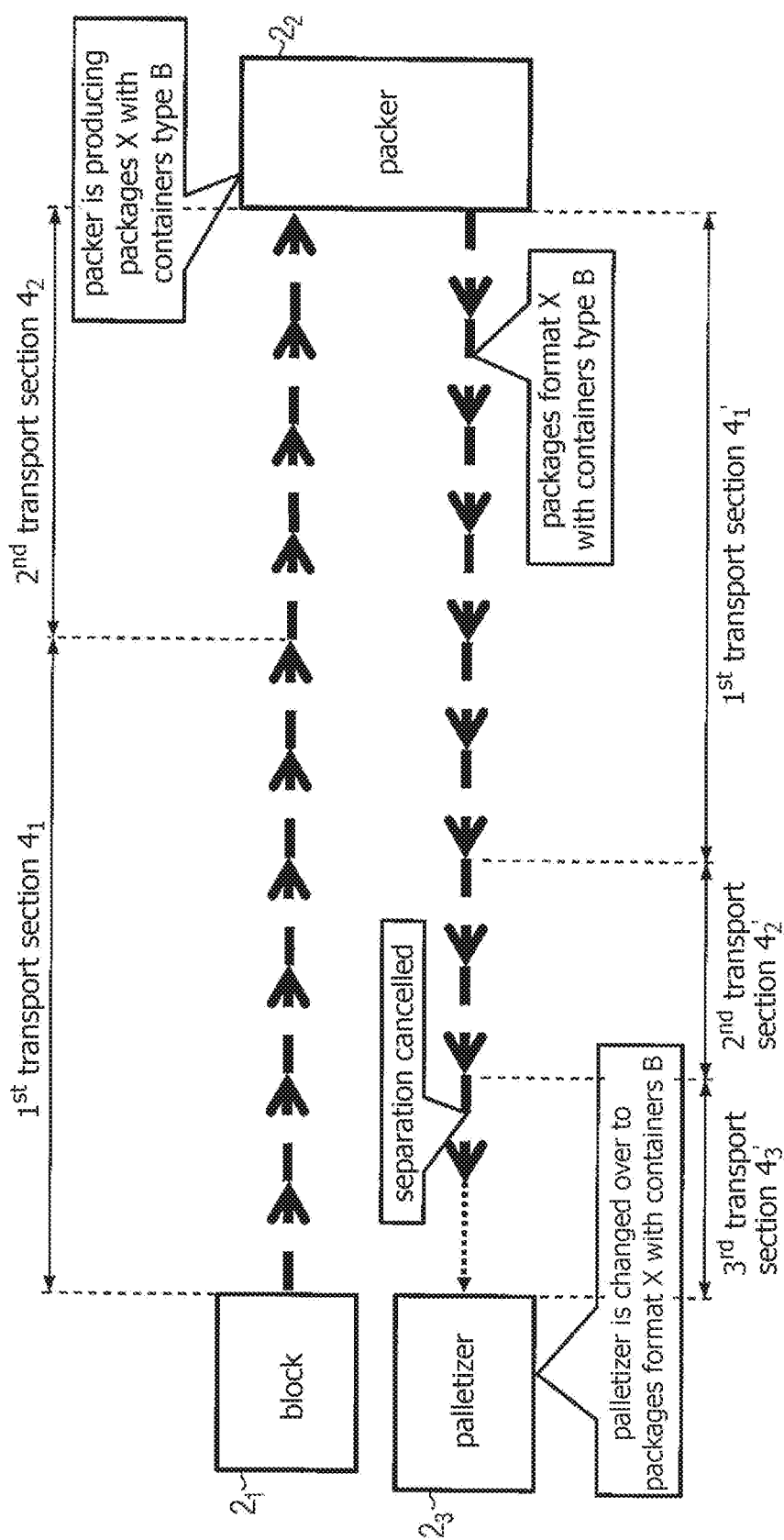
Figure 12:
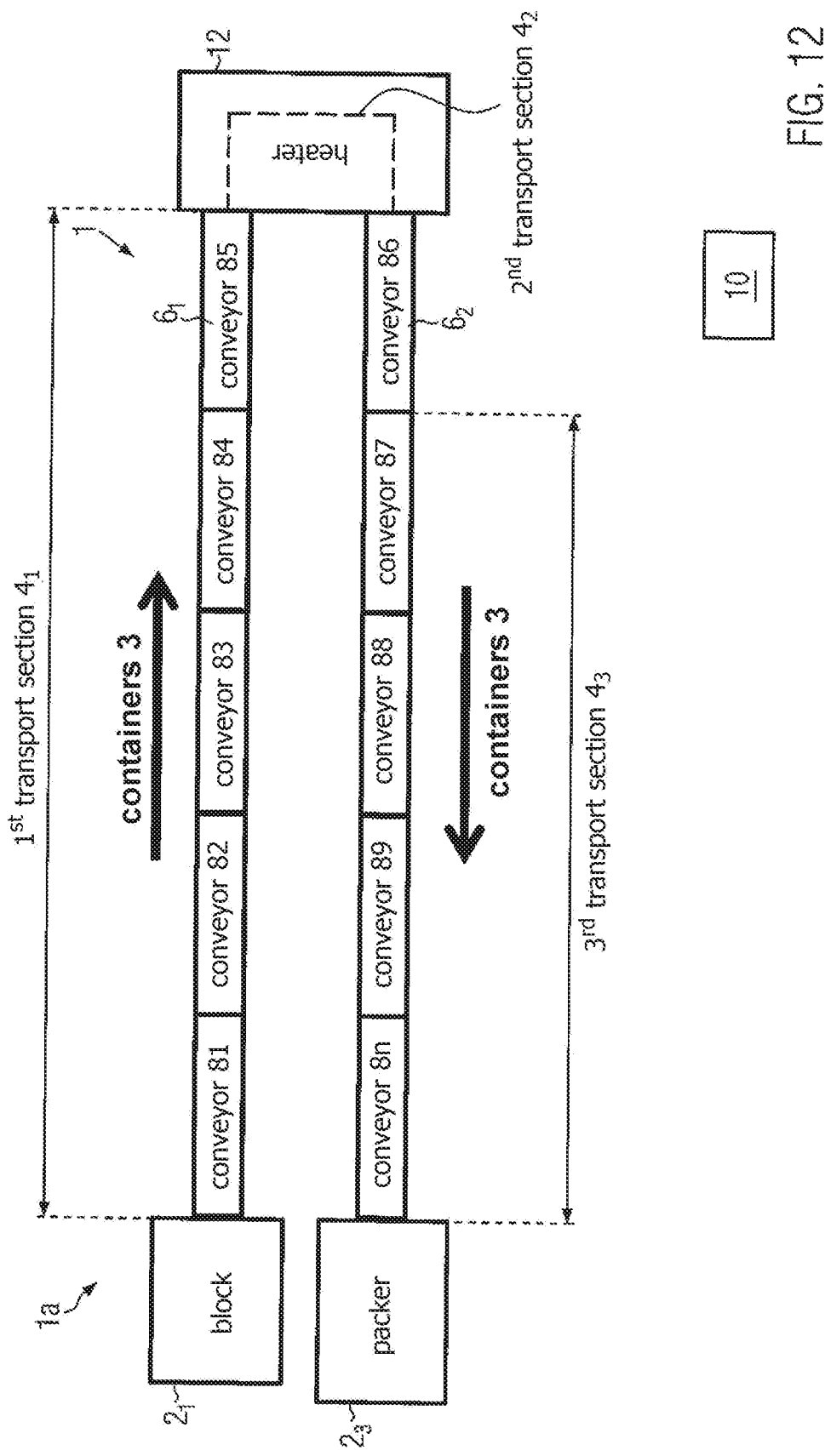
FIGS. 12-20 show a simplified schematic representation of a second embodiment according to the present invention with a heater.

FIG. 11 shows that second separating device $6'_2$ is also deactivated by control device 10. This can be done when it is recognized that no containers of type A are disposed in section $4'_3$ downstream of the separating device, i.e. the palletizer inlet or supply, respectively, has run empty. The palletizer can also comprise its own stop device which can be switched on and off by the palletizer itself. If the separating device is located relatively close to the palletizer, then it can also be expedient to have the separation only be canceled when the palletizer generates a signal that it is ready for operation for packages of containers of type B. Since the separation is canceled, the containers of type B can now pass through the third transport section toward the palletizer, where the production of the containers of type B is now running continuously and the changeover has been completed.

As described above, a separation is always canceled if it is determined that no containers of the preceding type A are disposed in a certain downstream transport section anymore. If, however, a malfunction at a container treatment machine downstream of the separating device or of a downstream conveyor is detected, so that a backup is to be expected or a backup has already occurred, then a malfunction signal is passed to control device 10 and the separating device is not deactivated.

FIGS. 12-20 show device $1a$ of FIGS. 1-11 in which block $2_1$ represents the first container treatment machine and packer $2_2$ the second container treatment machine. The device there corresponds substantially to the device described in FIG. 1, but where a heating device 12 is additionally provided between block $2_1$ and packer $2_2$. The heating device can be, for example, a pasteurizer or a device for heating the products, for example, to prevent condensation. However, heating device 12 can also be a cooling device for cooling down hot-filled products. In any case, the transport speed through heating device 12 is slower than the transport speed with conveyors $8_1$-$8_5$. A first transport section $4_1$ extends from block $2_1$ to the heating device, a second transport section extends through heating device 12, for example, until the end of the first conveyor downstream of heating device 12. A third transport section $4_3$ extends in a region downstream of heating device 12 and upstream of packer $2_2$. In this embodiment, first separating device $6_1$ comprises conveyor $8_5$ and second separating device $6_2$ conveyor $8_6$. The respective conveyors associated with the separating devices are therefore disposed at the end of the respective transport section, as already explained, because they have to be emptied before they are stopped.

Figure 13:
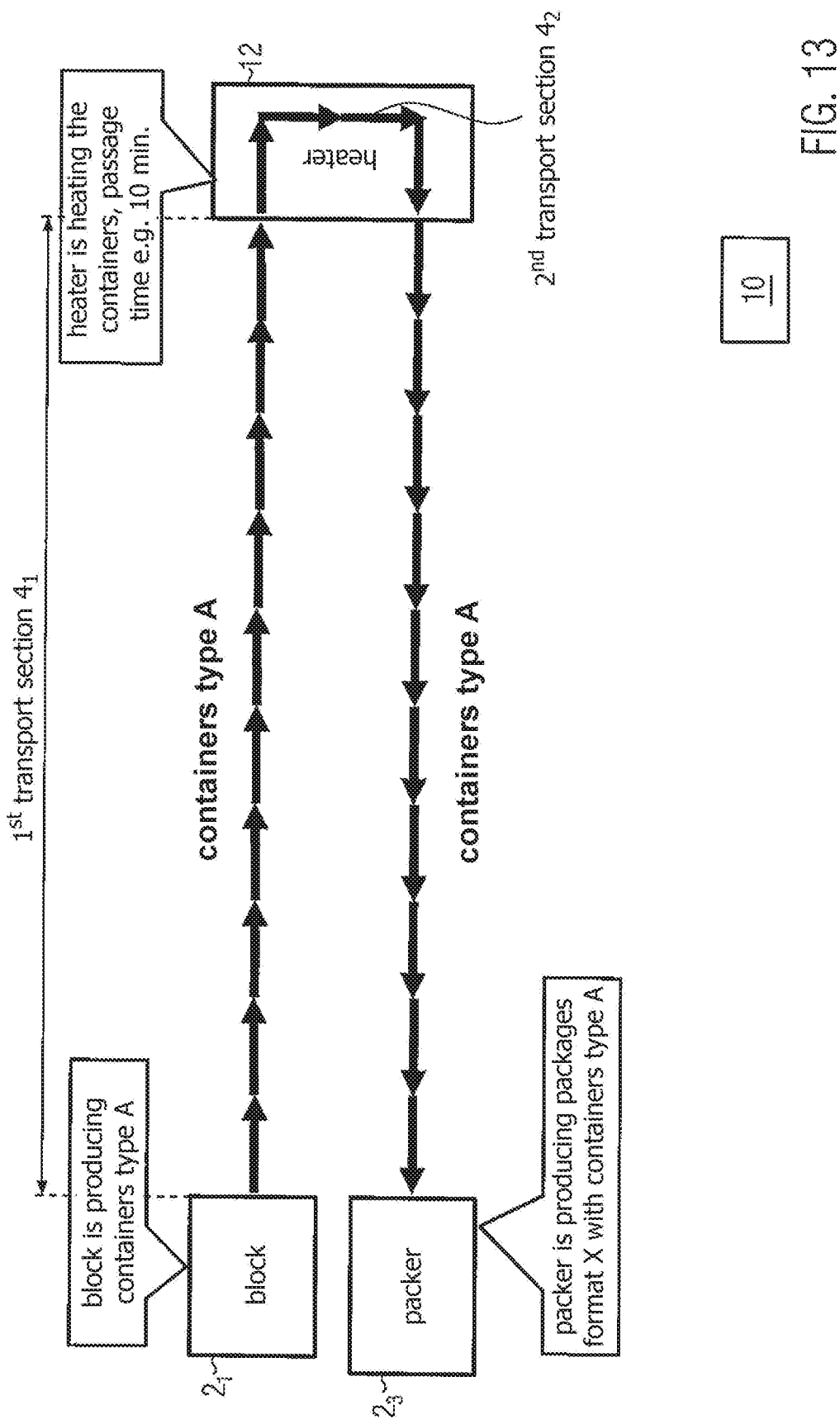

FIG. 13 now shows a method step in which the block produces containers of type A which are heated, for example, in heater 12. After heating, the containers of type A are then conveyed to packer $2_2$ which produces packages of containers of type A.

Figure 14:
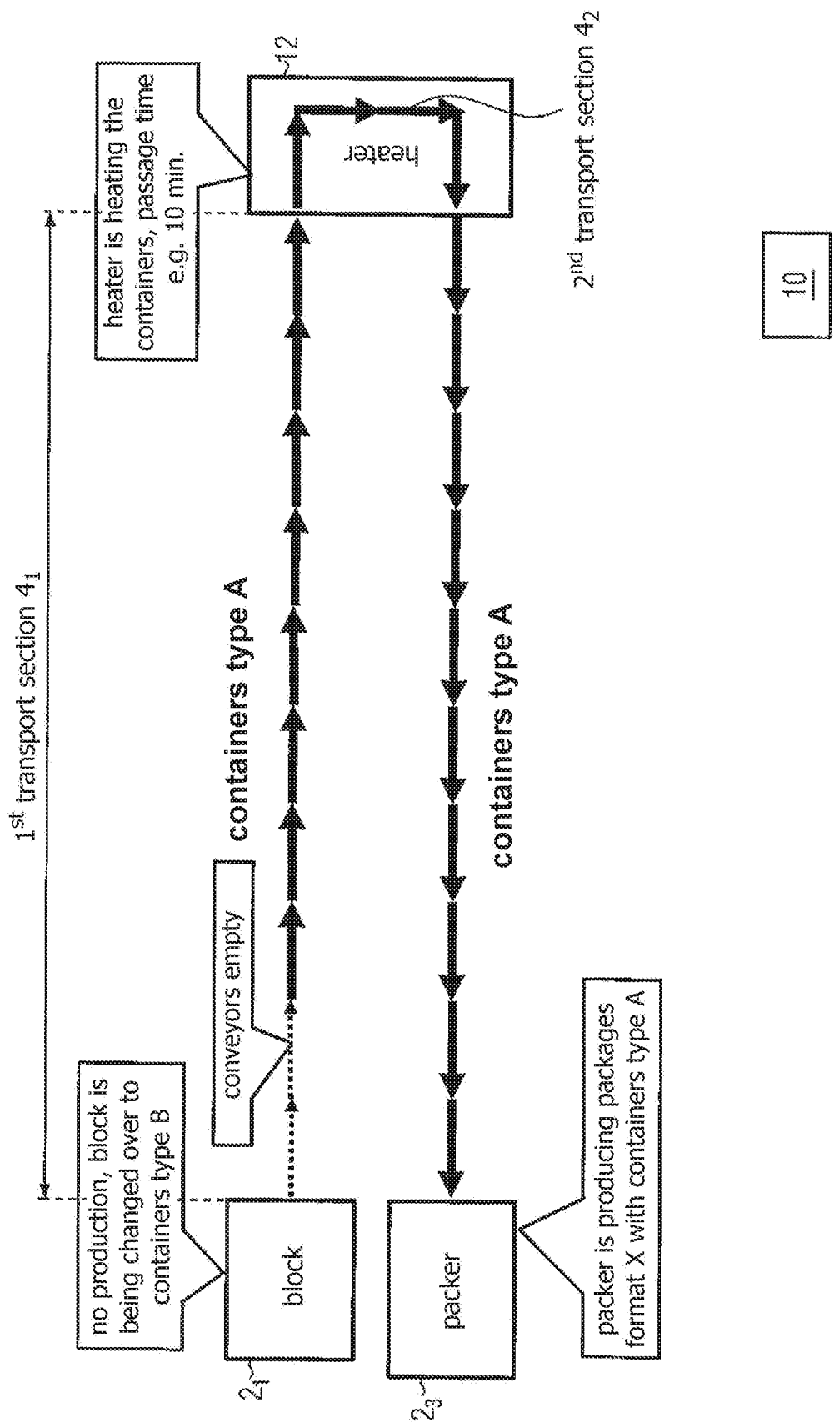
Figure 15:
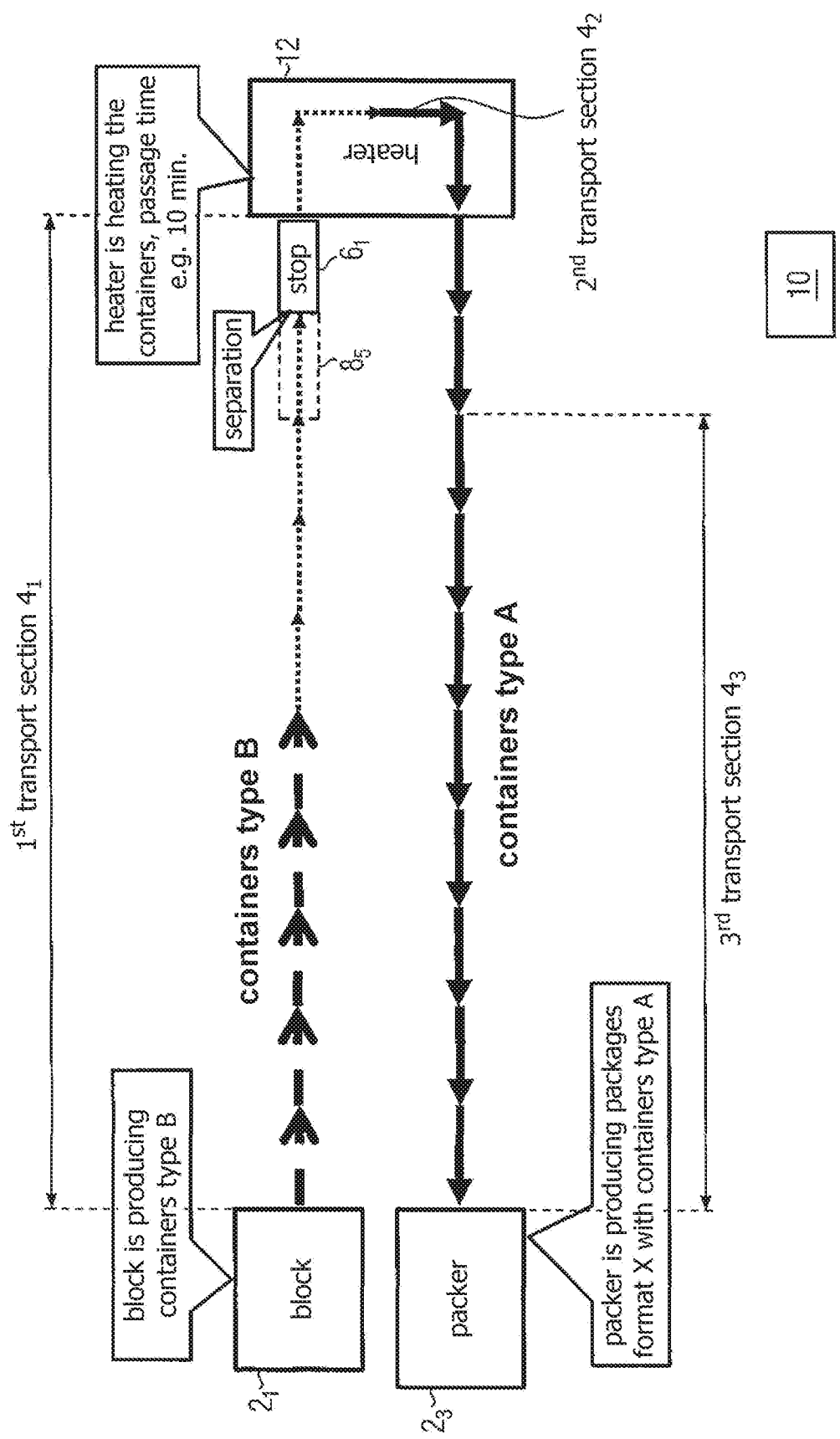
Figure 16:
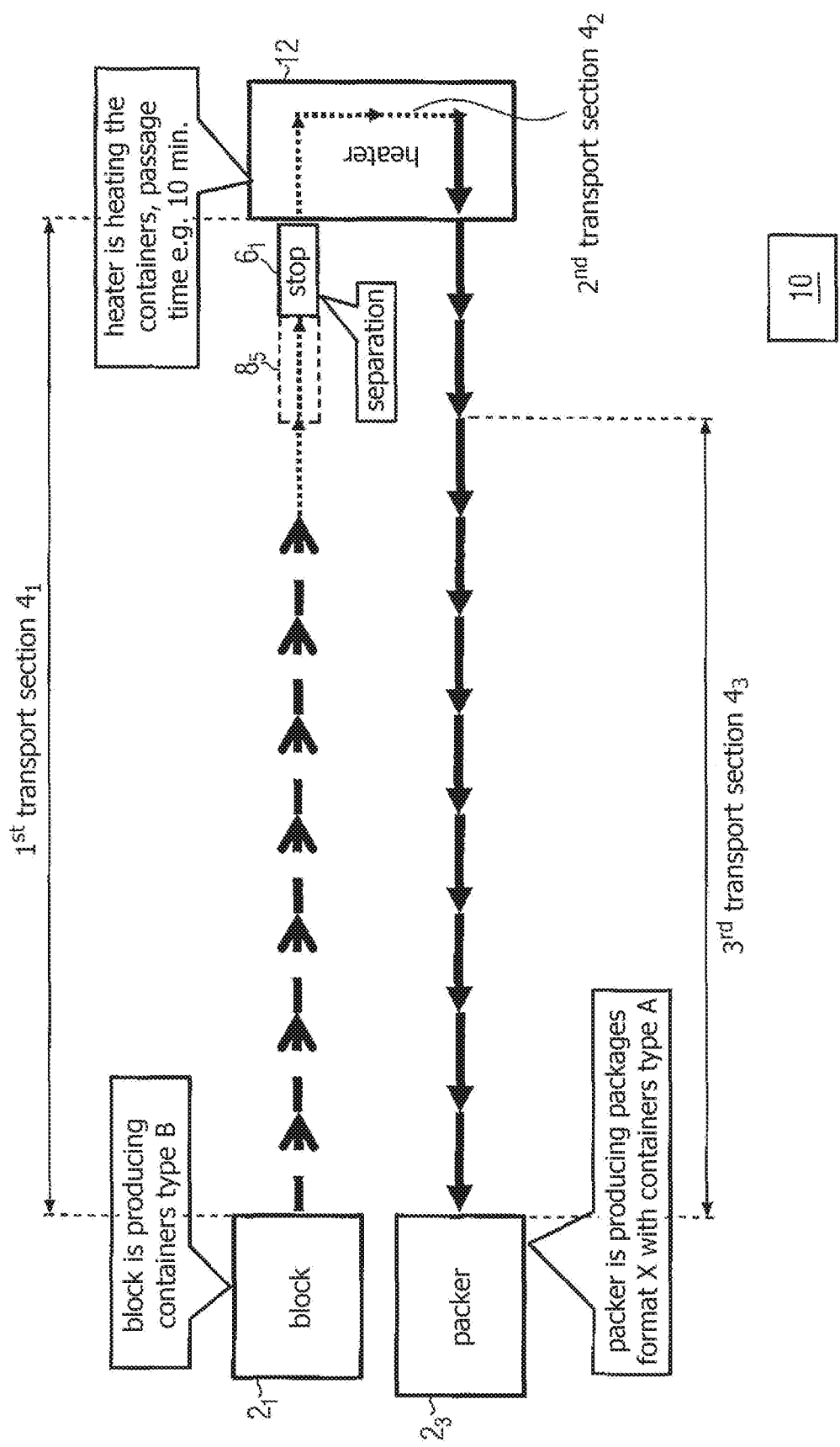

When changing over to containers of type B, the production of containers of type A ends. As shown in FIG. 14, the block is changed over to containers of type B so that the corresponding conveyors in first transport section $4_1$ are emptied. Once the block or the first container treatment machine $2_1$, respectively, has been changed over to containers of type B, the block can immediately start to produce containers of type B. If last conveyor $8_5$ is now emptied, i.e. if there are no containers of type A disposed on first transport section $4_1$ anymore, then separating element $6_1$ is activated, as shown in FIG. 15, in that, for example, conveyor $8_5$ stops. Transport section $4_1$ is therefore separated from transport section $4_2$ and any mixing of the containers of the different types cannot occur. Furthermore, transport section $4_2$ in heating device 12 is slowly emptied and the containers of type A move in the direction of packer $2_2$, see also FIG. 16.

Figure 17:
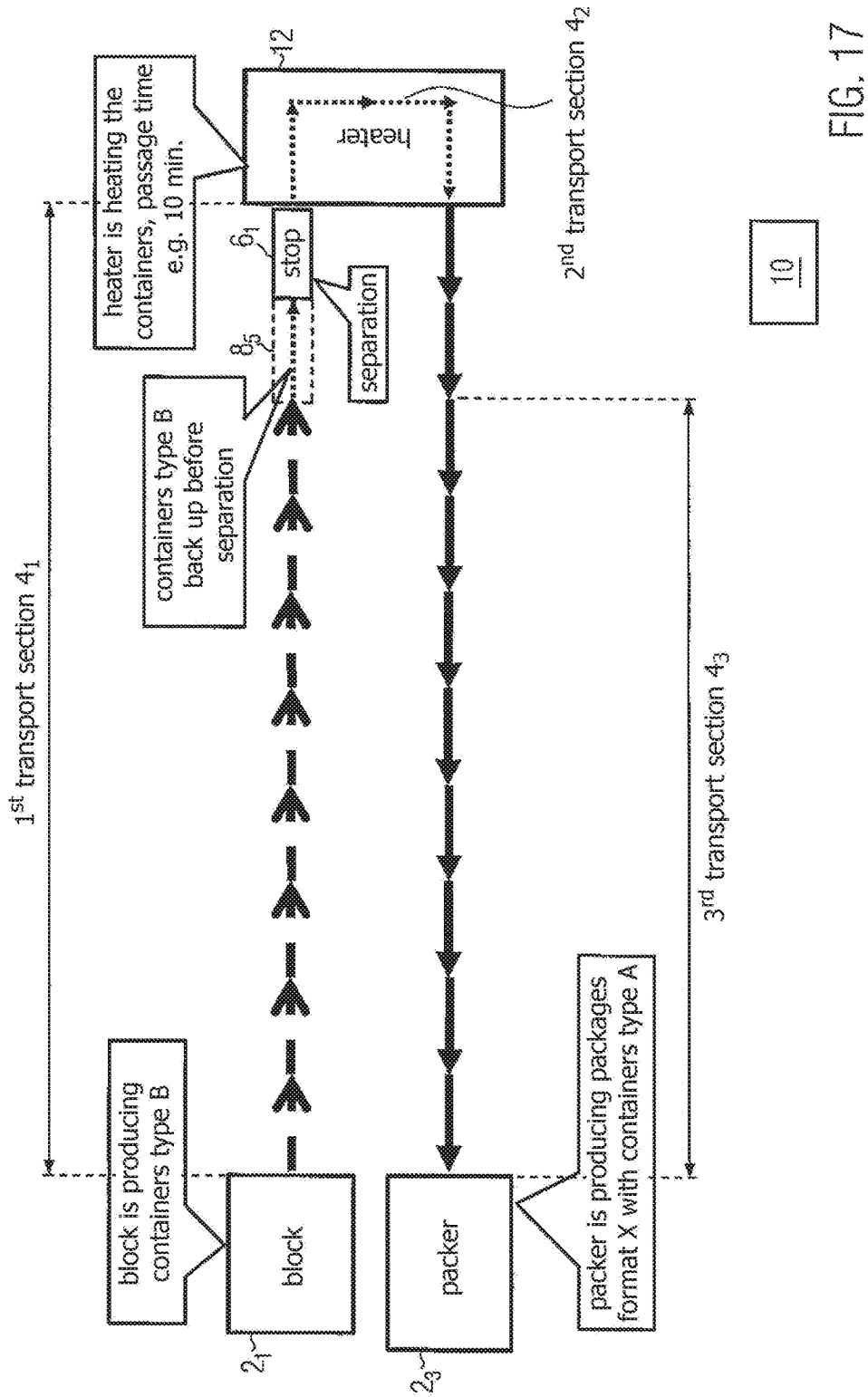
Figure 18:
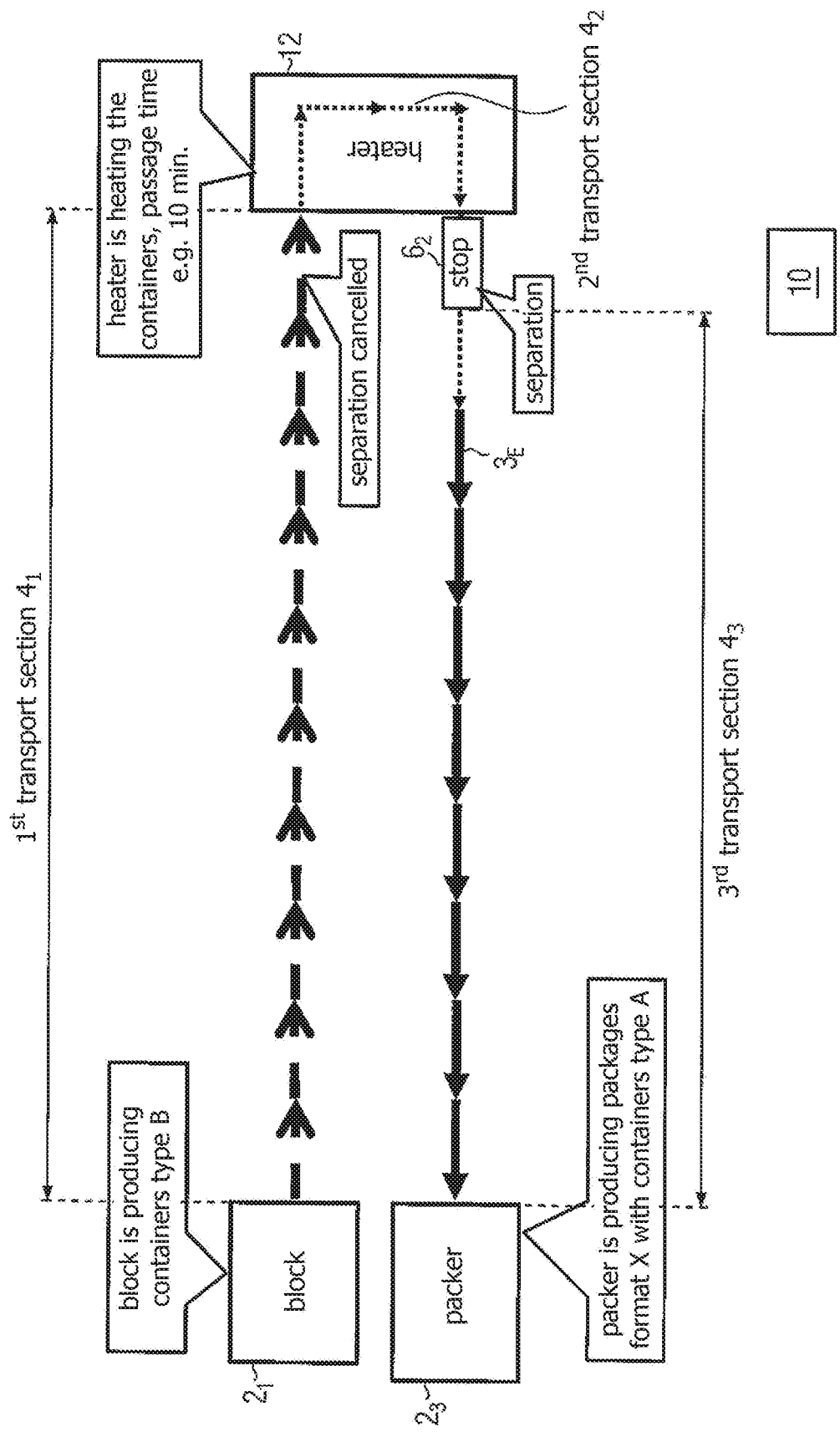
Figure 19:
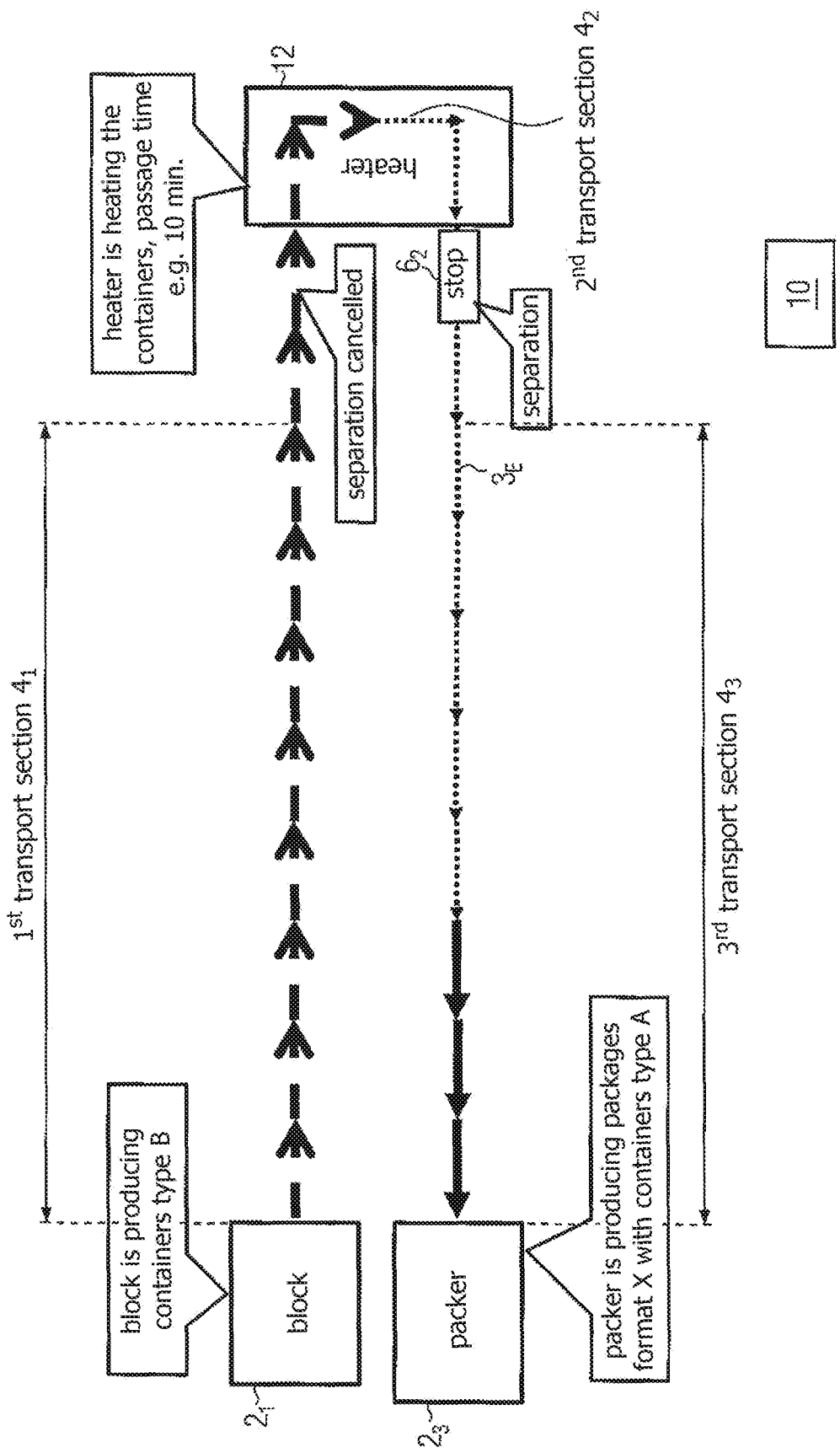

As indicated in FIG. 17, containers of type B back up upstream of activated separating device $6_1$. If it is now determined, as is apparent from FIG. 18, that second transport section $4_2$ has run empty, i.e. that no containers are disposed on last conveyor $8_6$ anymore, directly downstream of the heat treatment, then first separating device $6_1$ can be deactivated. When second transport section $4_2$ has run empty of containers of type A, as can be seen from FIG. 18, conveyor $8_6$ can be stopped, i.e. separating device $6_2$ can be activated. Since the containers of type B, which are now entering heating device 12, dwell in heating device 12 for a longer time anyway, no separate or only a small buffer region is necessary.

Figure 20:
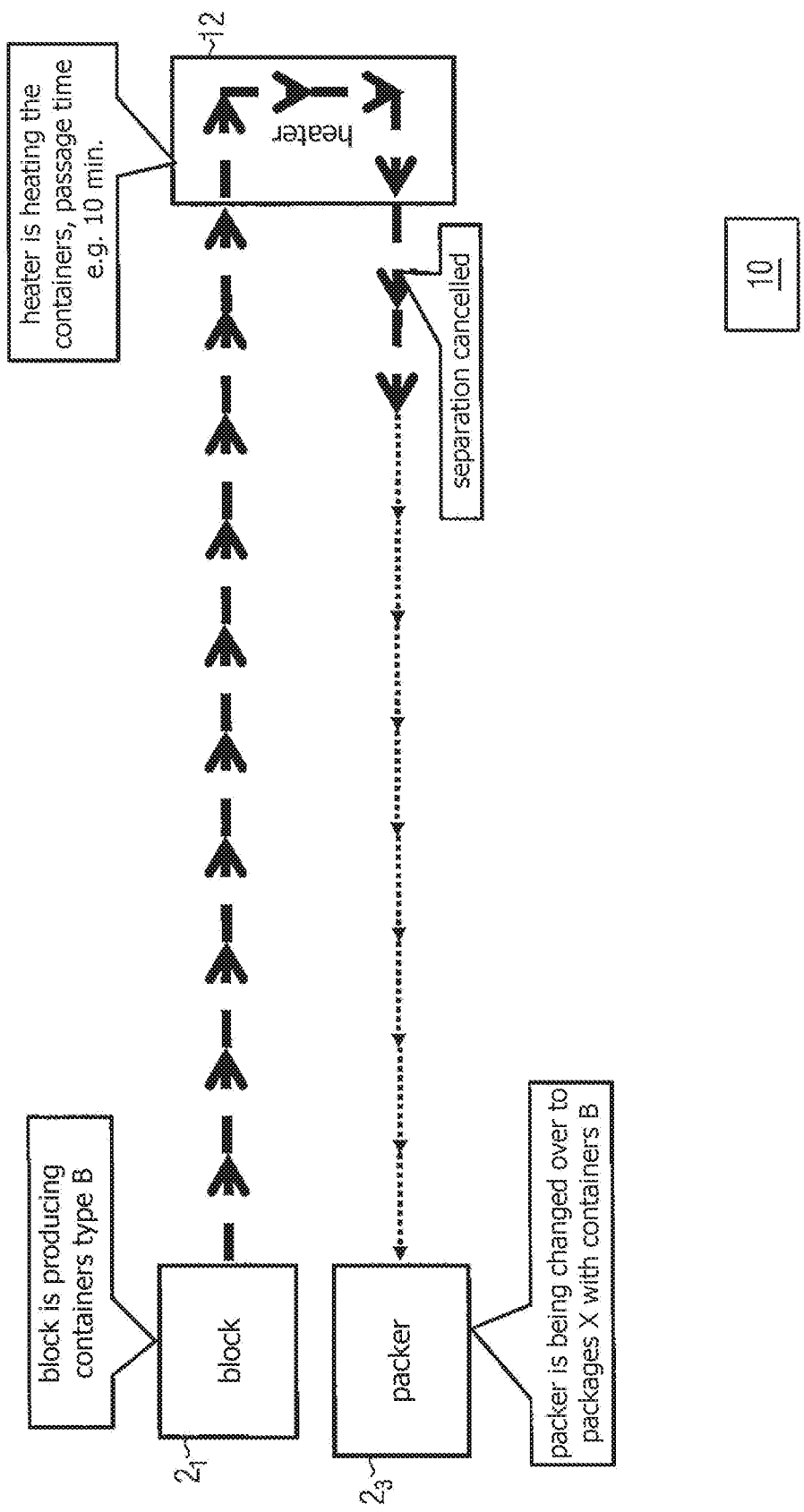

The containers of type A now run out in the direction of the packer, where the last container $3_E$ moves through third transport section $4_3$. As can be seen from FIG. 19, third transport section $4_3$ is now emptied and the packer is still producing packages with type A. If it is determined that no containers of type B are disposed in third transport section $4_3$, then second separating device $6_2$ is deactivated. i.e. conveyor $8_6$ starts up again. Containers of type B can therefore now also enter third transport section $4_3$. Emptied packer $2_2$ of FIG. 20 is now changed over to containers of type B and the containers of type B can be treated in packer $2_2$. The changeover or conversion of production from type A to type B has now been changed over.

The last separating device is advantageously in all embodiments not deactivated until the downstream container treatment machine has run completely empty of the previous container type and/or all previous containers have been transferred to the downstream container treatment machine. For this purpose, a respective container treatment machine can generate a corresponding signal.

Figure 21:
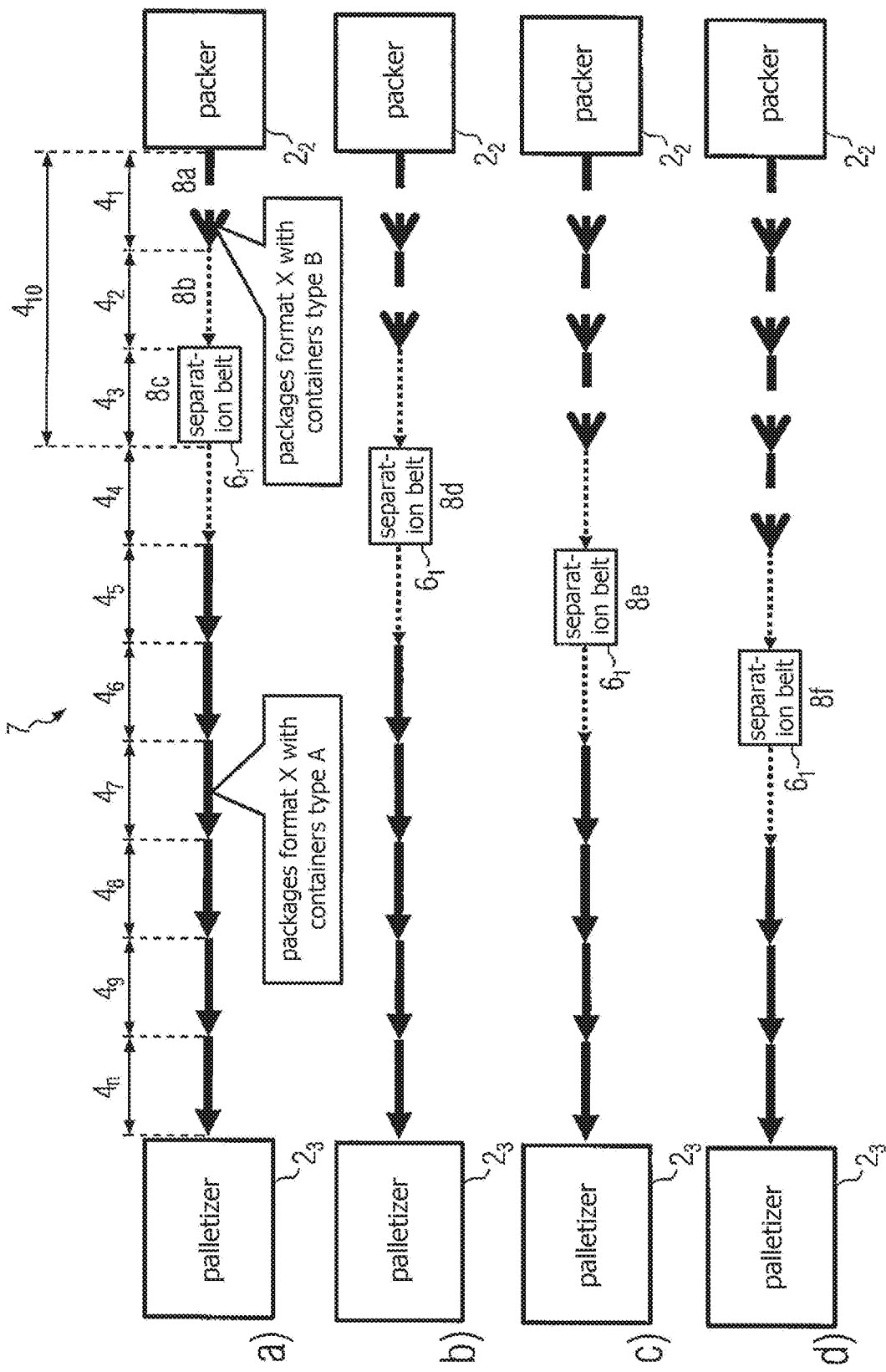
FIGS. 21*a-d* show a simplified schematic representation of a further embodiment according to the present invention.

The embodiment illustrated in the context of FIGS. 21a-d is likewise particularly advantageous for non-backup transport paths with several conveyors. A device is shown there which comprises, for example, a packer as a first container treatment machine and a palletizer as a second container treatment machine $2_3$. In this embodiment, transport device 7 again comprises a several conveyors $8_a$-$8_n$ which are arranged one behind the other. Transport sections $4_n$ each correspond to the transport path of a conveyor $8_n$, as shown in FIG. 21a. This means that if, for example, first conveyor $8_a$ has run empty, i.e. it is determined that first transport path $4_1$ has run empty, the respective conveyor $8_a$ can be halted. However, since the packer also takes a certain amount of time to be changed dover, the first transport section can also extend over several conveyors, presently, for example, over three, as illustrated by section $4_{10}$, where last conveyor $8_C$ acts as a separating device 6, when section $4_{10}$ has run empty. If it is determined that section $4_4$ connected downstream of separating device $6_1$ has likewise run empty, as can be seen from FIG. 21a, then associated conveyor $8_d$ is stopped (FIG. 21b) and thereby serves as the separation.

Therefore, this means, if the conveyors of containers of type A have respectively run empty, then the respectively emptied conveyor, which in the direction of transport is located at the front behind the last containers of type A, is stopped until the conveyor of containers of type A, that in the direction of transport is the following one, has run empty, which is then stopped again, where the preceding conveyor enters back into operation. The active separating devices therefore follow the motion of the containers of the first type in the direction of the palletizer (see also FIGS. 21c, 21d).

Figure 22:
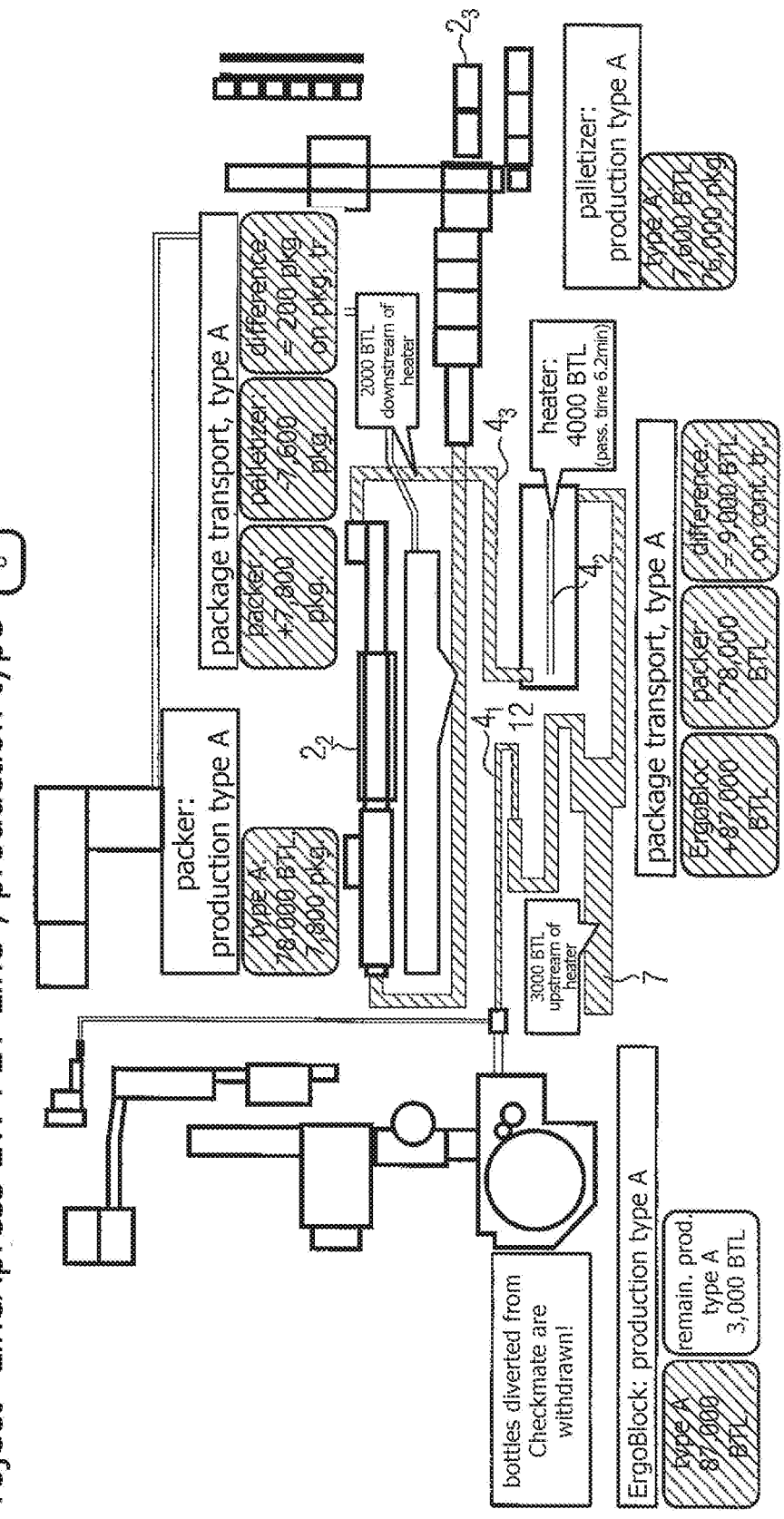
FIGS. 22-26 show a device according to the present invention by way of a PET line.

FIG. 22 shows the present invention in connection with a PET line. Where the embodiment substantially corresponds to the embodiment shown in FIG. 1. As is evident from FIG. 22, the number of containers of type A on container transport 7 can be determined by counting, for example, the containers in the block, i.e. presently first container treatment machine $2_1$, and by counting the individual containers of type A in the packer. The number of containers or packages on the transport path between packers and palletizer can be determined by calculating the difference between the packages at the packer and packages at the palletizer. Only containers of type A are produced in FIG. 22.

Figure 23:
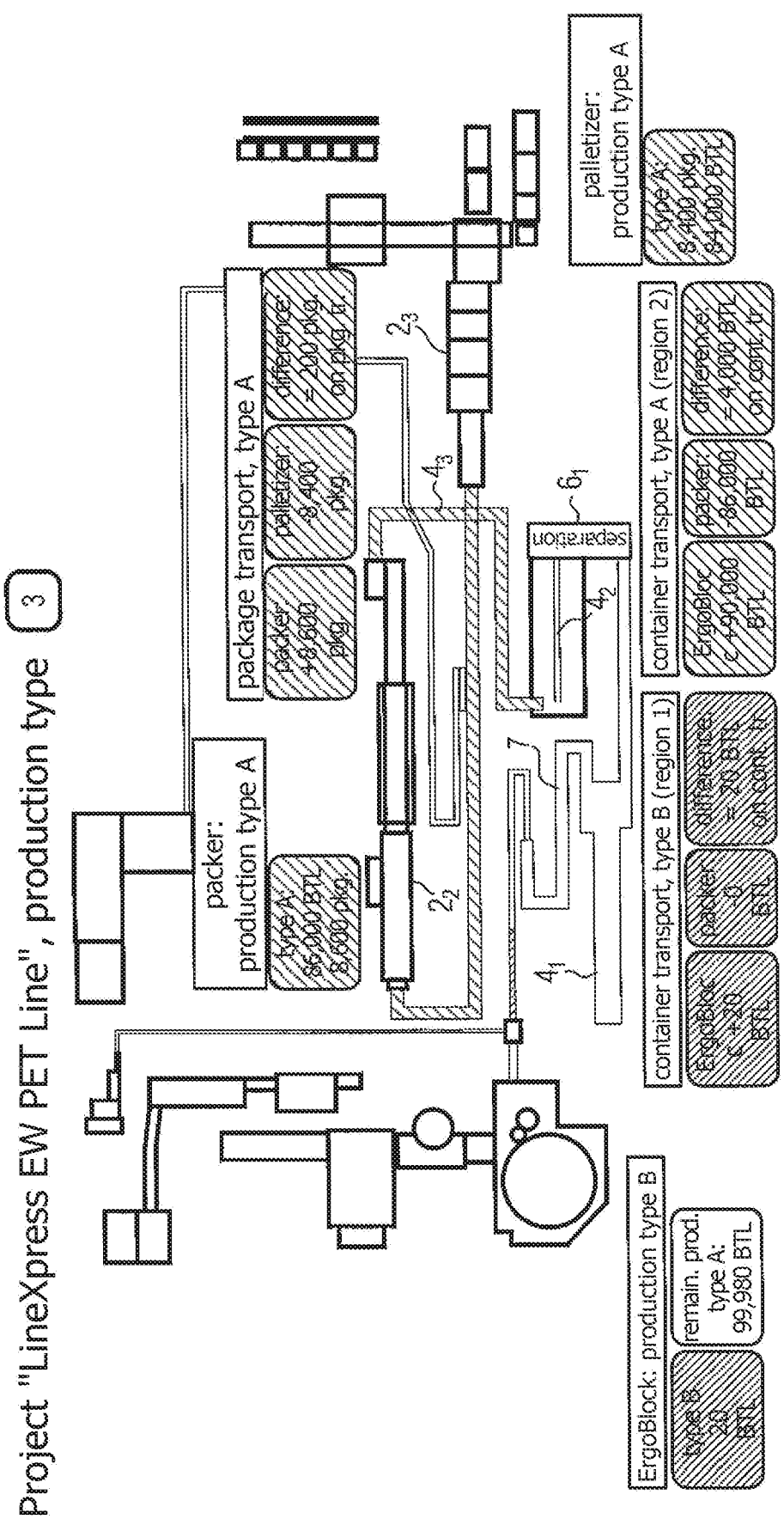

FIG. 23 already shows that block $2_1$ has been changed over to the production of containers of type B and transport device 7 has there already run empty of containers of type A and the first containers of type B are already transported by transport device 7 in the direction of heating device 12. Separation $6_1$ upstream of the heating device is activated there. It can be determined by counting the containers and calculating the difference, for example, how many containers of a respective type are disposed on the respective transport device. By tracking, for example, the container of type A last produced, it can also be determined, as described above, in which transport section the containers of type A are disposed.

Figure 24:
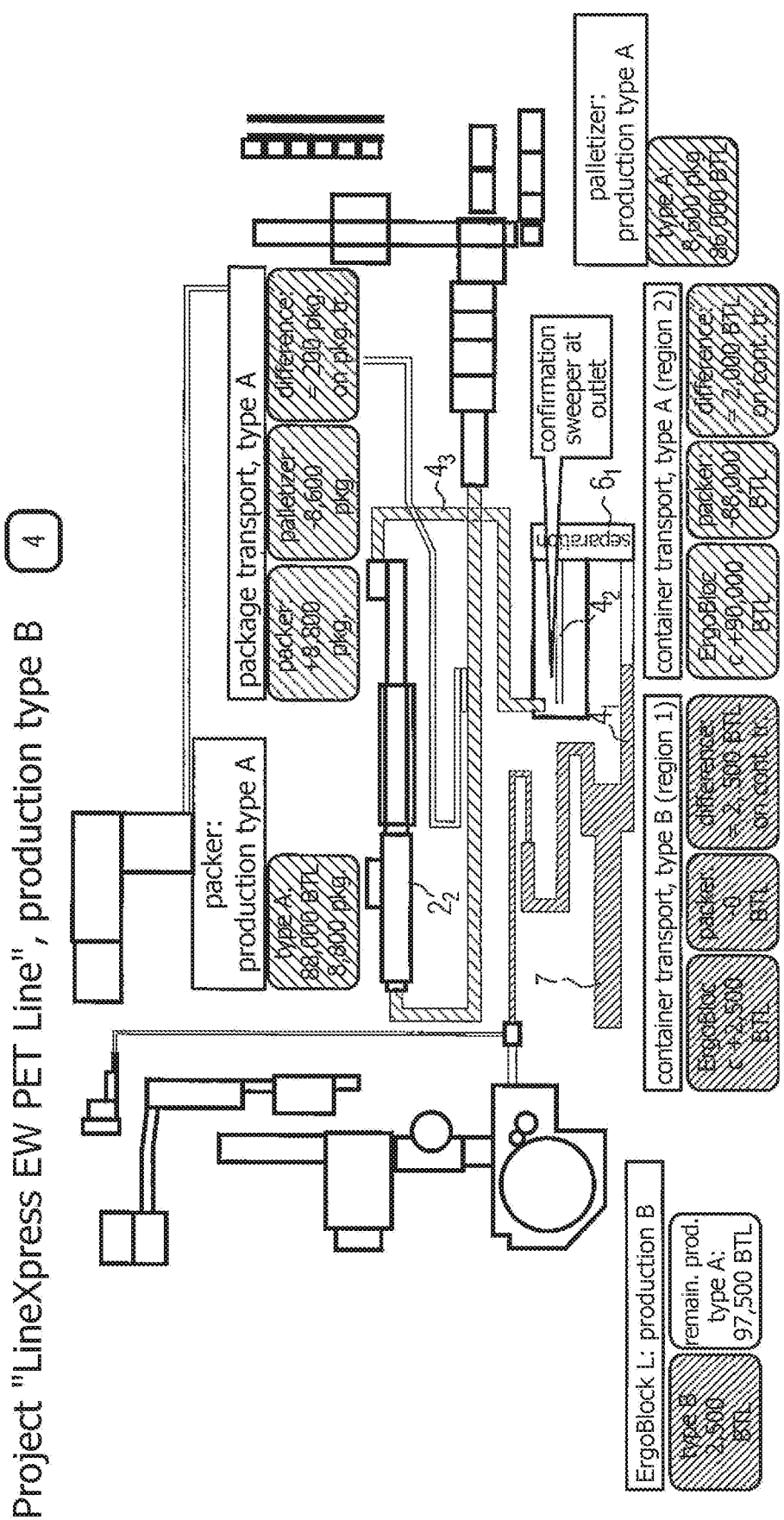
Figure 25:
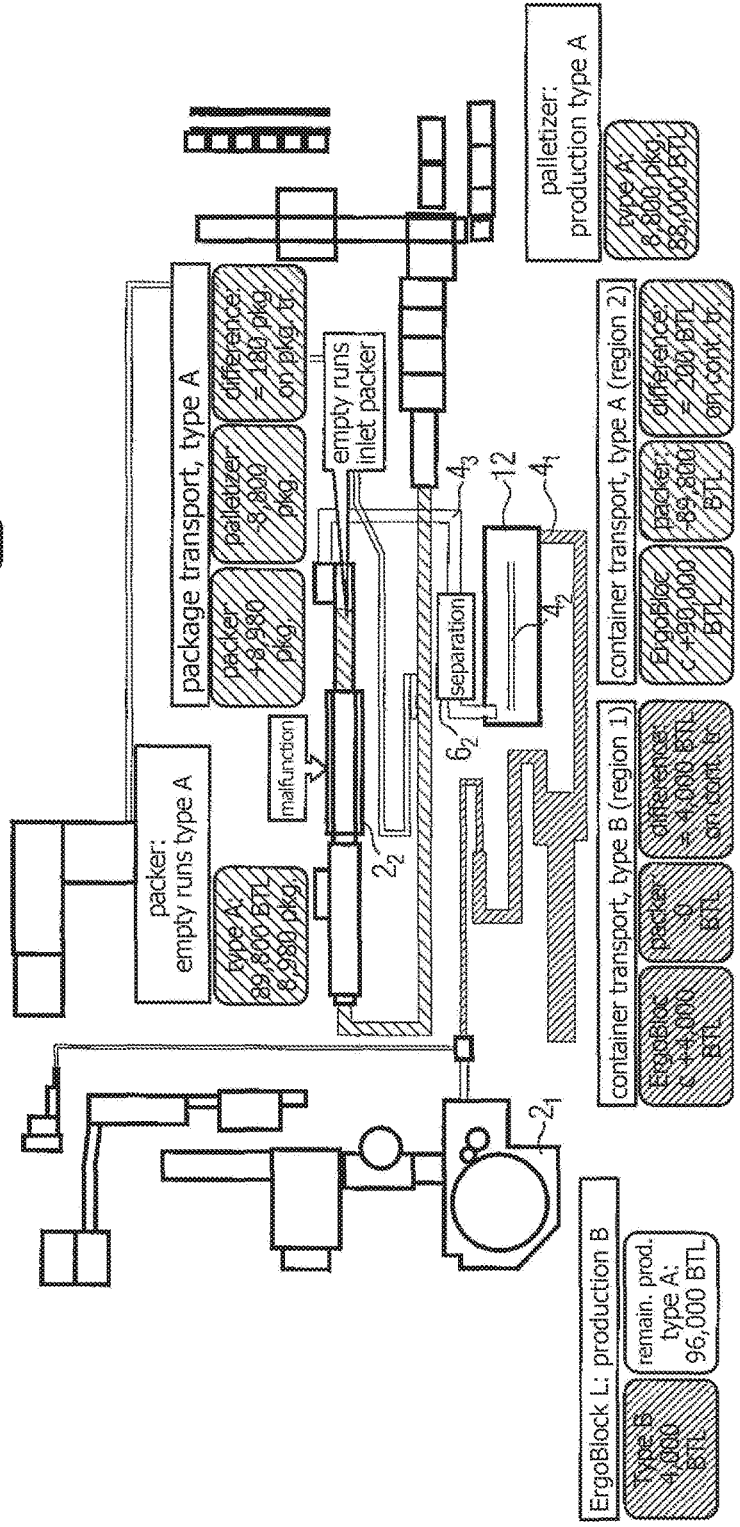

FIG. 24 now shows that several, presently for example, 2500 containers of type B are already disposed in a region between block $2_1$ and packer $2_2$. Since separation $6_1$ is already active, these containers are disposed in first transport section $4_1$. There are still 2,000 containers disposed downstream of heater 12. As described above and is evident from FIG. 25, there is now no container of type A disposed in transport section $4_2$ anymore, for which reason second separation $6_2$ has been activated. Disposed in transport section $4_3$, presently in the packer inlet, are only 200 containers. Even if a malfunction in packer $2_2$ were to occur and containers of type A would back up upstream of the packer, there would be no mixing of the containers of type A and B due to the activated separating devices downstream of heater 12.

Figure 26:
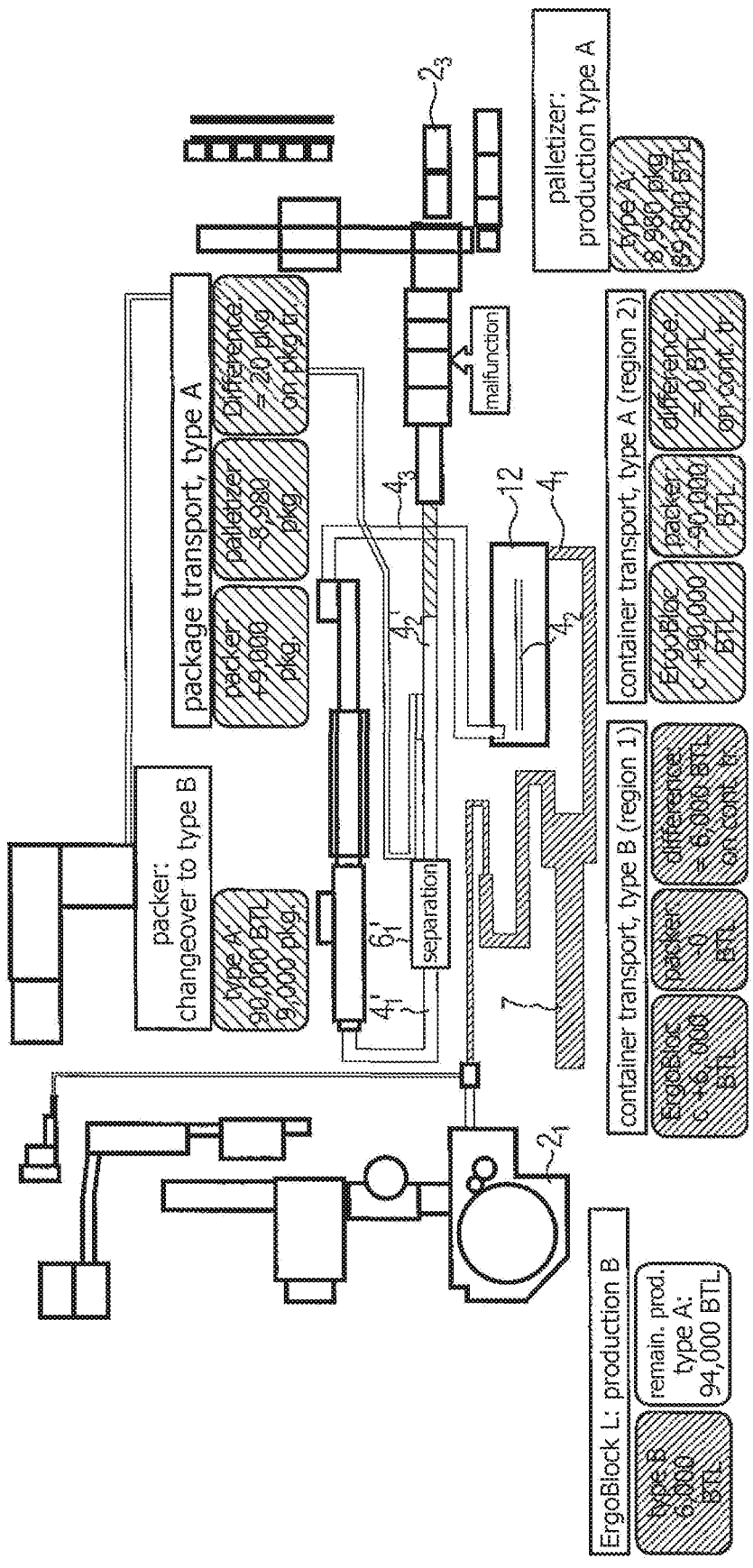

FIG. 26 shows the state in which only 20 containers are still transported on the package transport upstream of the palletizer. Separation $6'_1$ is activated there in order to prevent the different types from mixing, even if a malfunction of the palletizer were to occur. As described above, this separation can be deactivated when the transport path has emptied downstream of this separating device

The invention claimed is:

1. A method for treating containers with at least two container treatment machines, between which a transport device for transporting said containers is arranged, wherein the method comprises:
   when changing containers of type A to containers of type B,
      a separating device is activated between said first and said second container treatment machines which separates a flow of containers into a first and a second transport section after said first transport section has run empty of said containers of type A, where said first transport section adjoins said second transport section, said containers of type B are conveyed previously in said first transport section and backed up upstream of said separating device, while said containers of type A are conveyed out of said second transport section to said second container treatment machine, and thereafter said separating device between said first and said second transport sections is deactivated so that said backed-up and following said containers of type B are transported through said second transport section to said second container treatment machine, wherein said first container treatment machine sends a signal for an end of production of said containers of type A to a control device, and determines in dependence of said signal whether or not said containers are disposed on said first and/or $n^{th}+1$ transport section, where the a container of said containers of type A is tracked.

2. The method according to claim 1, wherein said separating device between said first and said second transport sections is deactivated after said second transport section has run empty of said containers of type A.

3. The method according to claim 1, wherein several separating devices are provided between said first and said second container treatment machines, where a further $n^{th}+2$ transport path ($4_{n+2}$) is provided downstream of an $n^{th}+1$ transport section ($4_{+i}$), where an $n^{th}+1$ separating device between said $n^{th}+1$ and said $n^{th}+2$ transport sections is activated after said $n^{th}+1$ transport section has run empty of said containers of type A, and said containers of type B are conveyed in said $n^{th}+1$ transport section, while said containers of first type A are transported out of said $n^{th}+2$ transport path, and said $n^{th}+1$ separating device is deactivated when said $n^{th}+2$ transport section has run empty of said containers of type A, where n∈N.

4. The method according to claim 1, wherein while said separating device is activated, said containers of second type B back up upstream of said separating device, and said backed-up second containers of type B pass through the entire second transport section when said separating device is deactivated.

5. The method according to claim 1, wherein said transport device comprises several individually actuatable conveyors and said at least one separating device comprises one of said conveyors which stops upon activation of said separating device such that said container back up, where said conveyor acts as a separating device is arranged in an end region of said respective transport section or said transport path of said conveyor corresponds to said transport section, where a respective specific conveyor is associated with a respective separating device, so that said at least two transport sections each have a predetermined length and position, and several transport sections are provided, each corresponding to said transport path of successive conveyors, where, when said conveyors have respectively run empty of said containers of type A, then said respectively emptied conveyor, which in the direction of transport is located at the front behind said containers of type A, is stopped until said conveyor of said containers of type A, that in the direction of transport is the following one, has run empty, which is then stopped again, where the preceding conveyor enters back into operation.

6. The method according to claim 1, wherein said separating device comprises a mechanical back-up element which is introduced into the flow of containers.

7. The method according to claim 1, said containers of type A and type B differ only to the extent that said same transport device is used without any changeover between said container treatment machines.

8. The method according to claim 1, wherein it is determined by way of at least one sensor on said first and/or $n^{th}+1$ transport section whether containers of said first type A are disposed in said first and/or in said second transport section.

9. A device for performing a method for treating containers of type A and containers of type B with at least two container treatment machines, the device comprising:

a first and a second container treatment machine, a transport device between said first and said second container treatment machines, wherein a separating device between said first and said second container treatment machines, wherein the separating device, upon activation, separates a flow of containers into a first and a second transport section such that said containers of type A back up upstream of said separating device, where said first transport section adjoins said second transport section in a direction of transport, a control device which is configured to activate said separating device between the first and a second transport section when there is a changeover from said containers of type A to said containers of type B, if no containers of type A are disposed on said first transport section, such that said first transport section is already fed said containers of type B while at the same time said containers of type A are conveyed out of said second transport section without said containers of type A and B being mixed, and said control device is configured to deactivate said separating device so that said backed-up and following said containers of type B is transported through said second transport section in a direction toward said second container treatment machine, wherein a heating or cooling device is arranged between said first and second container treatment machines and a separating device is arranged upstream of said heating or cooling device and/or downstream of said heating or cooling device.

10. A device according to claim 9, wherein said device comprises a plurality of separating devices between said first and second container treatment machines.

11. A device according to claim 9, wherein said device further comprises a first detection device which detects whether said first transport section has emptied during a product change and generates a signal when said first transport section is empty, on the basis of which said control device activates said separating device.

12. The device according to claim 9, wherein said device comprises a second detection device which detects whether said second transport section has emptied and either generates a signal on the basis of which said control device deactivates said separating device when said second transport path has emptied, or generates a respective signal when said second transport path has emptied and said second container treatment machine generates a signal that it is ready to treat said container of type B.

13. The device according to claim 9 wherein said transport device comprises a plurality of individually actuatable conveyors and said separating device comprises a conveyor which upon activation of said separating device stops such that said containers back up.

14. The device according to claim 13, wherein said first container treatment machine is a packer and said second container treatment machine is a palletizer.

15. The device according to claim 9, wherein said first and second container treatment machines is at least a machine from the following group: stretch blow-molding machine, filler, labeler, packer, palletizer, pusher.

16. The device according to claim 15, wherein said first machine is a block comprising a blow-molding machine and a labeler and a filler and a capper, and wherein the second container treatment machine is a packer or a palletizer.

17. A method for treating containers with at least two container treatment machines, between which a transport device for transporting said containers is arranged, wherein the method comprises:

when changing containers of type A to containers of type B, a separating device is activated between said first and said second container treatment machines which separates a flow of containers into a first and a second transport section after said first transport section has run empty of said containers of type A, where said first transport section adjoins said second transport section, said containers of type B are conveyed already in said first transport section and backed up upstream of said separating device, while said containers of type A are conveyed out of said second transport section to said second container treatment machine, and thereafter said separating device between said first and said second transport sections is deactivated in such a way that said backed-up and following said containers of type B are transported through said second transport section to said second container treatment machine, wherein an activated separating device is not deactivated when a control device receives a malfunction signal of said container treatment machine arranged downstream of said separating device or of a conveyor arranged downstream.

* * * * *